(12) United States Patent
Harase et al.

(10) Patent No.: US 11,142,187 B2
(45) Date of Patent: Oct. 12, 2021

(54) PARKING ASSISTANCE DEVICE

(71) Applicant: Mitsubishi Electric Corporation, Tokyo (JP)

(72) Inventors: Shinichi Harase, Tokyo (JP); Satoru Inoue, Tokyo (JP); Ryotaro Suzuki, Tokyo (JP); Wataru Tsujita, Tokyo (JP); Tsutomu Asahina, Tokyo (JP); Yoshitsugu Sawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 188 days.

(21) Appl. No.: 16/467,802

(22) PCT Filed: Jan. 18, 2017

(86) PCT No.: PCT/JP2017/001548
§ 371 (c)(1),
(2) Date: Jun. 7, 2019

(87) PCT Pub. No.: WO2018/134913
PCT Pub. Date: Jul. 26, 2018

(65) Prior Publication Data
US 2019/0329760 A1 Oct. 31, 2019

(51) Int. Cl.
*B60W 30/06* (2006.01)
*B60W 10/06* (2006.01)
(Continued)

(52) U.S. Cl.
CPC ............ *B60W 30/06* (2013.01); *B60W 10/06* (2013.01); *B60W 10/18* (2013.01); *B60W 10/20* (2013.01);
(Continued)

(58) Field of Classification Search
CPC ....................................................... G01S 15/93
See application file for complete search history.

(56) References Cited

U.S. PATENT DOCUMENTS

| 2011/0022269 A1 | 1/2011 | Nakazono et al. |
| 2012/0062396 A1 | 3/2012 | Inoue et al. |
| 2018/0180731 A1* | 6/2018 | Inoue ...................... G01S 13/87 |

FOREIGN PATENT DOCUMENTS

| JP | 2003-34206 A | 2/2003 |
| JP | 2003-54341 A | 2/2003 |

(Continued)

OTHER PUBLICATIONS

International Search Report, issued in PCT/JP2017/001548, PCT/ISA/210, dated Apr. 18, 2017.

*Primary Examiner* — Thomas G Black
*Assistant Examiner* — Ana D Thomas
(74) *Attorney, Agent, or Firm* — Birch, Stewart, Kolasch & Birch, LLP

(57) ABSTRACT

A parking assistance device includes: distance sensors for transmitting detection waves toward a side of a host vehicle while the host vehicle is traveling and receiving reflected waves of the detection waves; a reflection point calculating unit for calculating reflection points indicating positions where the detection waves have been reflected; a grouping unit for grouping the reflection points; a reference distance setting unit for setting a reference distance corresponding to a distance between a host vehicle position indicating the position of the traveling host vehicle and a reflection point group set by grouping; and an object determining unit for setting an object determining threshold value to be compared with the reference distance and determining whether an object corresponding to the reflection point group is a parked vehicle or a parking reference object by comparing the reference distance with the object determining threshold value.

12 Claims, 28 Drawing Sheets

(51) Int. Cl.
*B60W 10/18* (2012.01)
*B60W 10/20* (2006.01)

(52) U.S. Cl.
CPC ..... *B60W 2520/14* (2013.01); *B60W 2520/28* (2013.01); *B60W 2554/00* (2020.02); *B60W 2554/801* (2020.02)

(56) References Cited

FOREIGN PATENT DOCUMENTS

| JP | 2009-234294 A | 10/2009 |
| JP | 2014-101101 A | 6/2014 |
| JP | 2014-157501 A | 8/2014 |
| WO | WO 2011/024220 A1 | 3/2011 |

\* cited by examiner

PARKING ASSISTANCE DEVICE

TECHNICAL FIELD

The present invention relates to a parking assistance device.

BACKGROUND ART

Conventionally, when a vehicle executes parallel parking or perpendicular parking, a technique of detecting an object existing on a side of the vehicle (hereinafter referred to as "host vehicle") using a distance sensor provided in the host vehicle has been developed. In addition, a technique of determining whether a detected object is another vehicle being parked (hereinafter referred to as "parked vehicle") or an object along which the host vehicle is positioned (hereinafter referred to as "parking reference object") has been developed.

For example, a parking assistance device disclosed in Patent Literature 1 includes two distance sensors (Fr sonar 31 and Rr sonar 32) provided on the left side portion of a host vehicle (host vehicle V) and two distance sensors (Fr sonar 31 and Rr sonar 32) provided on the right side portion of the host vehicle (host vehicle V). The two distance sensors (Fr sonar 31 and Rr sonar 32) are set in ranges in which detectable ranges (Fr range 31a and Rr range 32a) in the height direction are different from each other. When the host vehicle (host vehicle V) executes parallel parking, the parking assistance device disclosed in Patent Literature 1 detects an object existing on a side of the host vehicle (host vehicle V) using the two distance sensors (Fr sonar 31 and Rr sonar 32) and determines whether the detected object is a parked vehicle (another vehicle Va or Vb) or a parking reference object (curb E or μl).

CITATION LIST

Patent Literatures

Patent Literature 1: JP 2014-101101 A

SUMMARY OF INVENTION

Technical Problem

The parking assistance device disclosed in Patent Literature 1 uses the two distance sensors having different detectable ranges in the height direction in order to determine whether the object is a parked vehicle or a parking reference object. Therefore, the minimum number of distance sensors required for making the determination for each of the left and right sides of the host vehicle is large, and it is difficult to secure an installation space of the distance sensors in the host vehicle disadvantageously.

The present invention has been achieved in order to solve the above problems, and an object of the present invention is to provide a parking assistance device capable of determining whether an object detected using a distance sensor is a parked vehicle or a parking reference object and capable of easily securing an installation space of a distance sensor in a host vehicle.

Solution to Problem

A parking assistance device of the present invention includes: at least one distance sensor for transmitting a detection wave toward a side of a host vehicle while the host vehicle is traveling and receiving a reflected wave of the detection wave; a processor; and a memory storing instructions which, when executed by the processor, causes the processor to perform processes of: calculating a reflection point indicating a position where the detection wave is reflected; grouping the reflection points; setting a reference distance corresponding to a distance between a host vehicle position indicating a position of the host vehicle that is traveling and a reflection point group set by the grouping; and setting an object determining threshold value to be compared with the reference distance and determining whether an object corresponding to the reflection point group is a parked vehicle or a parking reference object by comparing the reference distance with the object determining threshold value, in which the processor updates the object determining threshold value when the processor determines that the object is the parked vehicle.

Advantageous Effects of Invention

According to the present invention, with the configuration described above, it is possible to determine whether an object detected using a distance sensor is a parked vehicle or a parking reference object, and to easily secure an installation space of a distance sensor in a host vehicle.

DESCRIPTION OF EMBODIMENTS

Hereinafter, in order to describe the present invention in more detail, embodiments for performing the present invention will be described with reference to attached drawings.

First Embodiment

Figure 1:
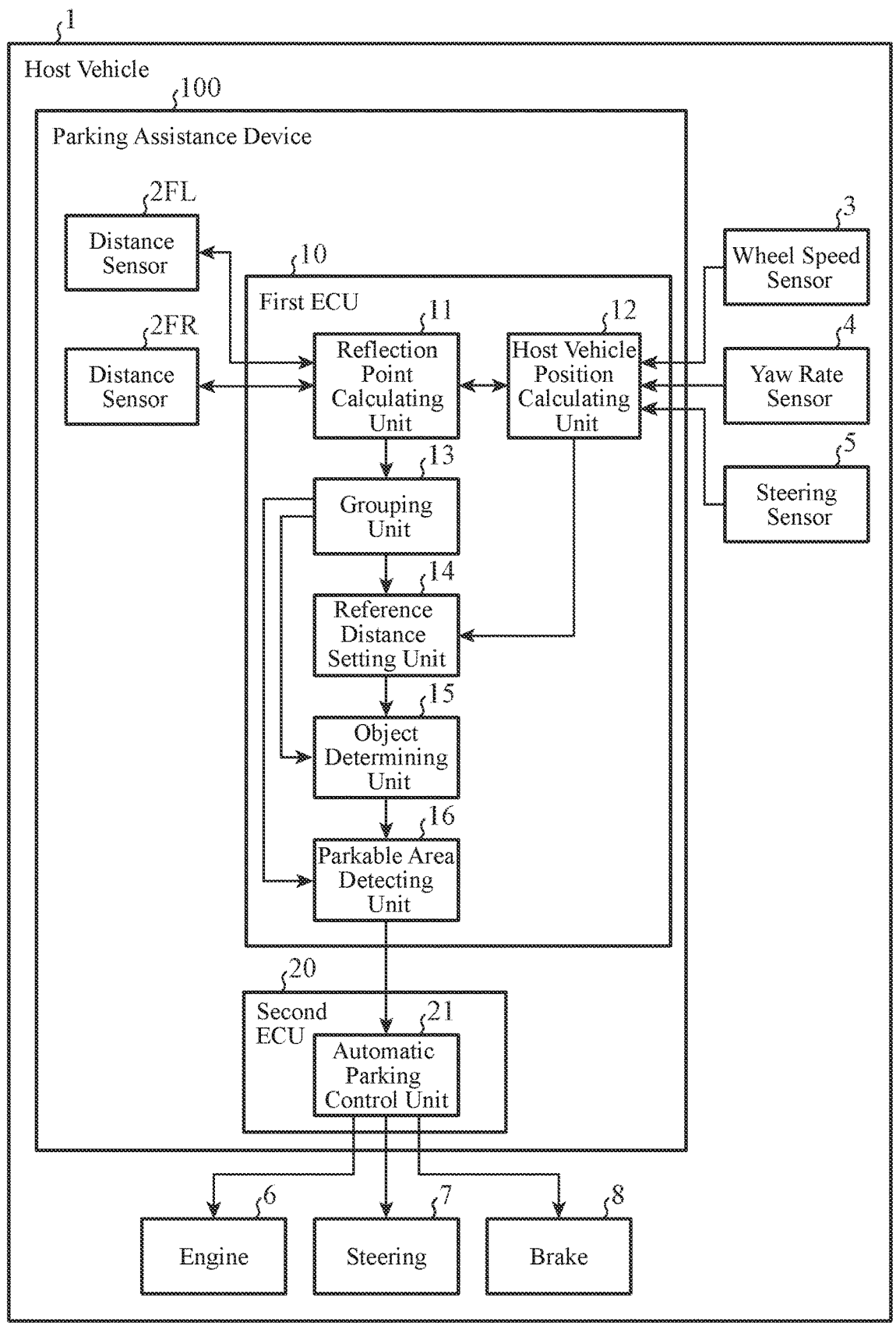
FIG. 1 is a functional block diagram illustrating a state in which a parking assistance device according to a first embodiment of the present invention is mounted on a host vehicle.
Figure 2:
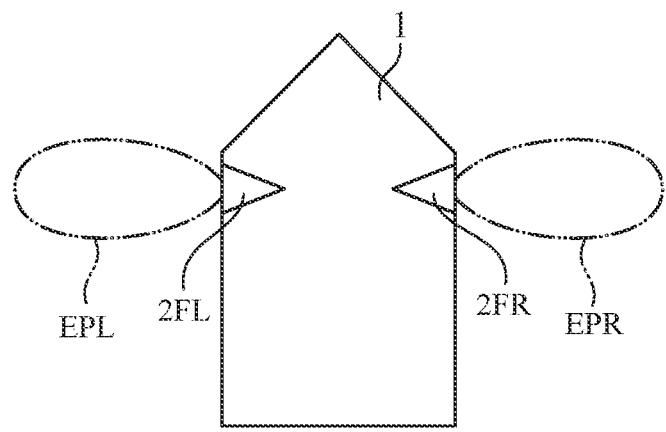
FIG. 2 is an explanatory diagram illustrating arrangement of distance sensors in the host vehicle according to the first embodiment of the present invention.

FIG. 1 is a functional block diagram illustrating a state in which a parking assistance device according to a first embodiment of the present invention is mounted on a host vehicle. FIG. 2 is an explanatory diagram illustrating arrangement of a distance sensor in the host vehicle according to the first embodiment of the present invention. A parking assistance device 100 according to the first embodiment will be described with reference to FIGS. 1 and 2.

As illustrated in FIG. 1, a host vehicle 1 includes distance sensors 2FL and 2FR. More specifically, as illustrated in FIG. 2, the host vehicle 1 includes one distance sensor 2FL on the left side portion of the front half portion thereof, and one distance sensor 2FR on the right side portion of the front half portion thereof. Each of the distance sensors 2FL and 2FR transmits a detection wave such as an ultrasonic wave, a radio wave in a millimeter wave band, or a laser beam, and receives a reflected wave of the detection wave.

Hereinafter, an example in which ultrasonic sensors are used for the distance sensors 2FL and 2FR in the first embodiment will be mainly described. That is, one distance sensor 2FL transmits an ultrasonic wave toward the left side of the host vehicle 1, and one distance sensor 2FR transmits an ultrasonic wave toward the right side of the host vehicle 1. In FIG. 2, illustrated are a radiation pattern EPL of an ultrasonic wave to the left side of the host vehicle 1 and a radiation pattern EPR of an ultrasonic waves to the right side of the host vehicle 1.

The host vehicle 1 includes a wheel speed sensor 3, a yaw rate sensor 4, and a steering sensor 5. The wheel speed sensor 3 detects a rotation speed of a wheel of the host vehicle 1 and outputs a pulse signal corresponding to the rotation speed (hereinafter referred to as "vehicle speed signal"). The yaw rate sensor 4 detects a yaw rate of the host vehicle 1 and outputs a signal indicating the yaw rate (hereinafter referred to as "yaw rate signal"). The steering sensor 5 detects a steering angle of the host vehicle 1 and outputs a signal indicating the steering angle (hereinafter referred to as "steering angle signal").

A reflection point calculating unit 11 causes the distance sensors 2FL and 2FR to transmit ultrasonic waves while the host vehicle 1 is traveling at a speed equal to or lower than a predetermined speed (hereinafter referred to as "low speed", for example, a speed of 10 km/hour or less) for parallel parking or perpendicular parking. The reflection point calculating unit 11 calculates a distance value depending on propagation time of an ultrasonic wave when the distance sensors 2FL and 2FR receive reflected waves.

In addition, while the host vehicle 1 is traveling at a low speed for parallel parking or perpendicular parking, the reflection point calculating unit 11 instructs a host vehicle position calculating unit 12 to calculate the position of the host vehicle 1 (hereinafter referred to as "host vehicle position") at each time point during the travel. The reflection point calculating unit 11 acquires a host vehicle position calculated by the host vehicle position calculating unit 12. The reflection point calculating unit 11 calculates a coordinate point indicating a position where an ultrasonic wave has been reflected (hereinafter referred to as "reflection point") by so-called "two-circle intersection processing" using a calculated distance value and a host vehicle position acquired from the host vehicle position calculating unit 12.

For example, it is assumed that one distance sensor 2FL transmits and receives an ultrasonic wave twice while the host vehicle 1 is traveling. The reflection point calculating unit 11 calculates the position of the distance sensor 2FL using a host vehicle position calculated by the host vehicle position calculating unit 12 when the distance sensor 2FL transmits and receives each ultrasonic wave. The reflection point calculating unit 11 calculates an arc having the position of the distance sensor 2FL when transmitting and receiving the first ultrasonic wave as a center and having a distance value depending on propagation time of the first ultrasonic wave as a radius. The reflection point calculating unit 11 calculates an arc having the position of the distance sensor 2FL when transmitting and receiving the second ultrasonic wave as a center and having a distance value depending on propagation time of the second ultrasonic wave as a radius. The reflection point calculating unit 11 calculates the intersection of these arcs as one reflection point.

The host vehicle position calculating unit 12 calculates a host vehicle position using a vehicle speed signal, a yaw rate signal, a steering angle signal, and the like in accordance with an instruction from the reflection point calculating unit 11.

A grouping unit 13 groups reflection points calculated by the reflection point calculating unit 11. Specifically, for example, when a distance between adjacent reflection points is a value less than a predetermined threshold value (hereinafter referred to as "grouping threshold value"), the grouping unit 13 puts these reflection points into an identical group. In contrast, when a distance between adjacent reflection points is a value equal to or more than the grouping threshold value, the grouping unit 13 puts these reflection points into different groups.

When ultrasonic waves transmitted by the distance sensors 2FL and 2FR are reflected by a parked vehicle and a parking reference object, the grouping unit 13 normally sets a plurality of groups, and each of the groups includes a plurality of reflection points. Hereinafter, each individual group set by the grouping unit 13 is referred to as "reflection point group".

A reference distance setting unit 14 sets a value corresponding to a distance between a host vehicle position calculated by the host vehicle position calculating unit 12 and each reflection point group set by the grouping unit 13 (hereinafter referred to as "reference distance"). Specifically, for example, the reference distance setting unit 14 calculates a distance between each of the plurality of reflection points included in each of the plurality of reflection point groups and a host vehicle position, and sets a minimum value among the calculated distances as a reference distance of each of the plurality of reflection point groups.

By comparing a reference distance of each reflection point group set by the reference distance setting unit 14 with a predetermined threshold value (hereinafter referred to as "object determining threshold value"), the object determining unit 15 determines whether an object corresponding to each reflection point group (hereinafter also simply referred to as "object") is a parked vehicle or a parking reference object. Details of processing by the object determining unit 15 will be described later with reference to the flowchart of FIG. 6.

Note that the parking reference object is an object along which the host vehicle 1 is positioned as described above. More specifically, when the host vehicle 1 executes parallel parking, the parking reference object is an object along which a left side portion or a right side portion of the host vehicle 1 is positioned, for example, a curb or a wall. In contrast, when the host vehicle 1 executes perpendicular parking, the parking reference object is an object along which a front end portion or a rear end portion of the host vehicle 1 is positioned, for example, a shopping cart placed in a parking lot of a supermarket.

A parkable area detecting unit 16 detects an area in which the host vehicle 1 can execute parallel parking or perpendicular parking (hereinafter referred to as "parkable area") using a reflection point group set by the grouping unit 13 and a determination result by the object determining unit 15. Details of processing of detecting a parkable area will be described later with reference to the flowchart of FIG. 7.

In addition, the parkable area detecting unit 16 sets an area targeted for parallel parking or perpendicular parking by the host vehicle 1 in the parkable area (hereinafter referred to as "parking target area"). The parkable area detecting unit 16 instructs an automatic parking control unit 21 to execute automatic parking in a parking target area.

The automatic parking control unit 21 executes automatic parking of the host vehicle 1 by controlling a torque of an engine 6, a steering 7, a brake 8, and the like in accordance with an instruction from the parkable area detecting unit 16. At this time, the automatic parking control unit 21 guides the host vehicle 1 to a parking target area set by the parkable area detecting unit 16.

Note that the automatic parking control unit 21 uses a vehicle speed signal, a yaw rate signal, a steering angle signal, and the like when executing automatic parking. In FIG. 1, a connection line between the wheel speed sensor 3 and the automatic parking control unit 21, a connection line between the yaw rate sensor 4 and the automatic parking control unit 21, and a connection line between the steering sensor 5 and the automatic parking control unit 21 are not illustrated.

The reflection point calculating unit 11, the host vehicle position calculating unit 12, the grouping unit 13, the reference distance setting unit 14, the object determining unit 15, and the parkable area detecting unit 16 are provided, for example, in an electronic control unit (hereinafter referred to as "first ECU") 10 mounted on the host vehicle 1. The automatic parking control unit 21 is provided, for example, in another electronic control unit (hereinafter referred to as "second ECU") 20 mounted on the host vehicle 1. The distance sensors 2FL and 2 FR, the reflection point calculating unit 11, the host vehicle position calculating unit 12, the grouping unit 13, the reference distance setting unit 14, the object determining unit 15, the parkable area detecting unit 16, and the automatic parking control unit 21 constitute a main part of the parking assistance device 100.

Figure 3A:
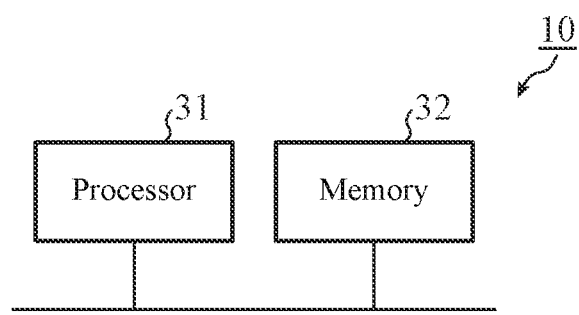
FIG. 3A is a hardware configuration diagram illustrating a main part of a first ECU according to the first embodiment of the present invention.

Next, a hardware configuration of a main part of the first ECU 10 will be described with reference to FIG. 3. As illustrated in FIG. 3A, the first ECU 10 is constituted by a computer, and includes a processor 31 and a memory 32. The memory 32 stores a program for causing the computer to function as the reflection point calculating unit 11, the host vehicle position calculating unit 12, the grouping unit 13, the reference distance setting unit 14, the object determining unit 15, and the parkable area detecting unit 16 illustrated in FIG. 1. The processor 31 reads and executes the program stored in the memory 32. As a result, the functions of the reflection point calculating unit 11, the host vehicle position calculating unit 12, the grouping unit 13, the reference distance setting unit 14, the object determining unit 15, and the parkable area detecting unit 16 illustrated in FIG. 1 are executed.

The processor 31 is constituted by, for example, a central processing unit (CPU), a digital signal processor (DSP), a microcontroller, or a microprocessor. The memory 32 is constituted by, for example, a semiconductor memory such as a random access memory (RAM), a read only memory (ROM), a flash memory, an erasable programmable read only memory (EPROM), or an electrically erasable programmable read-only memory (EEPROM), or a magnetic disk such as a hard disk drive (HDD).

Figure 3B:
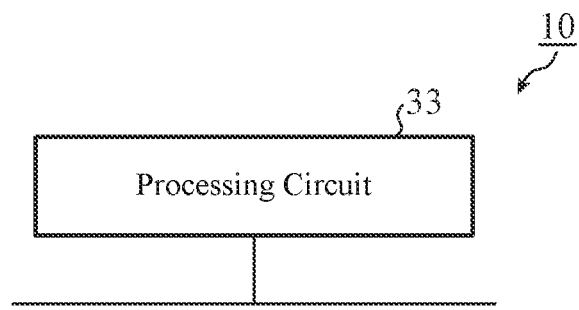
FIG. 3B is another hardware configuration diagram illustrating the main part of the first ECU according to the first embodiment of the present invention.

Alternatively, as illustrated in FIG. 3B, the first ECU 10 is constituted by a dedicated processing circuit 33. The processing circuit 33 is, for example, an application specific integrated circuit (ASIC), a field-programmable gate array (FPGA), a system large-scale integration (LSI), or a combination thereof.

Note that each of the functions of the reflection point calculating unit 11, the host vehicle position calculating unit 12, the grouping unit 13, the reference distance setting unit 14, the object determining unit 15, and the parkable area detecting unit 16 illustrated in FIG. 1 may be executed by the processing circuit 33. Alternatively, the functions of the respective units may be executed collectively by the processing circuit 33. Alternatively, some of the functions of the reflection point calculating unit 11, the host vehicle position calculating unit 12, the grouping unit 13, the reference distance setting unit 14, the object determining unit 15, and the parkable area detecting unit 16 illustrated in FIG. 1 may be executed by the processor 31 and the memory 32 illustrated in FIG. 3A, and the remaining functions may be executed by the processing circuit 33 illustrated in FIG. 3B.

Figure 4A:
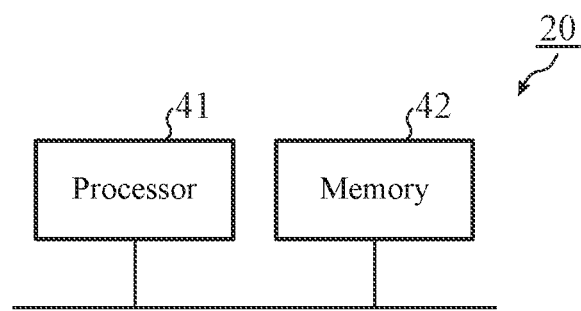
FIG. 4A is a hardware configuration diagram illustrating a main part of a second ECU according to the first embodiment of the present invention.

Next, a hardware configuration of a main part of the second ECU 20 will be described with reference to FIG. 4. As illustrated in FIG. 4A, the second ECU 20 is constituted by a computer, and includes a processor 41 and a memory 42. The memory 42 stores a program for causing the computer to function as the automatic parking control unit 21 illustrated in FIG. 1. The processor 41 reads and executes the program stored in the memory 42. As a result, the function of the automatic parking control unit 21 illustrated in FIG. 1 is executed.

The processor 41 is constituted by, for example, a CPU, a DSP, a microcontroller, or a microprocessor. The memory 42 is constituted by, for example, a semiconductor memory such as a RAM, a ROM, a flash memory, an EPROM, or an EEPROM, or a magnetic disk such as an HDD.

Figure 4B:
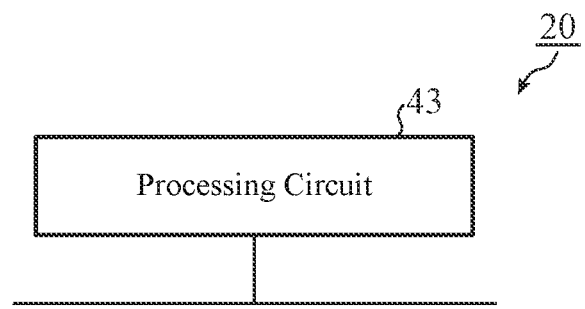
FIG. 4B is another hardware configuration diagram illustrating the main part of the second ECU according to the first embodiment of the present invention.

Alternatively, as illustrated in FIG. 4B, the second ECU 20 is constituted by a dedicated processing circuit 43. The processing circuit 43 is, for example, an ASIC, an FPGA, a system LSI, or a combination thereof.

Figure 5A:
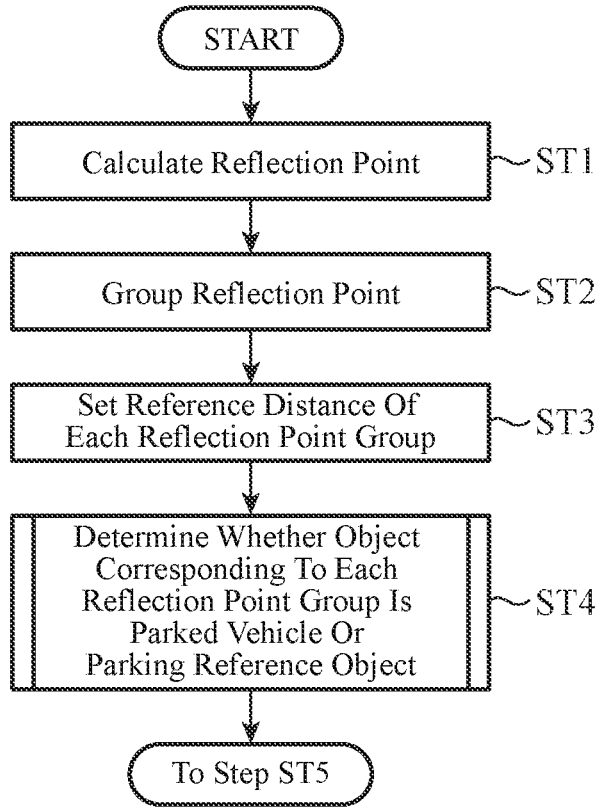
FIG. 5A is a flowchart illustrating operation of the parking assistance device according to the first embodiment of the present invention.
Figure 5B:
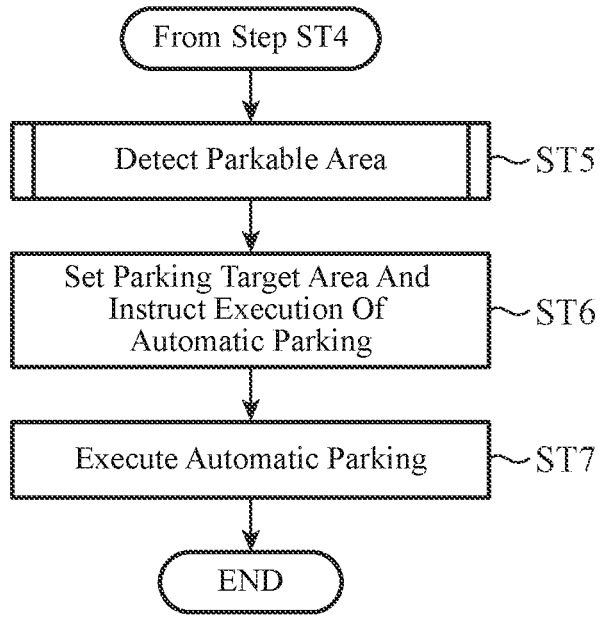
FIG. 5B is a flowchart illustrating operation of the parking assistance device according to the first embodiment of the present invention.

Next, operation of the parking assistance device 100 will be described with reference to the flowchart of FIG. 5.

While the host vehicle 1 is traveling at a low speed for parallel parking or perpendicular parking, the reflection point calculating unit 11 causes the distance sensors 2FL and 2FR to transmit ultrasonic waves. The reflection point calculating unit 11 calculates a distance value depending on propagation time of an ultrasonic wave when the distance sensors 2FL and 2FR receive reflected waves. In addition, the reflection point calculating unit 11 instructs the host vehicle position calculating unit 12 to calculate a host vehicle position and acquires the host vehicle position calculated by the host vehicle position calculating unit 12. When the host vehicle 1 stops or when a traveling distance of the host vehicle 1 at a low speed exceeds a predetermined distance (for example, five meters), the parking assistance device 100 starts processing in step ST1.

First, in step ST1, the reflection point calculating unit 11 calculates a reflection point using a distance value calculated while the host vehicle 1 is travelling at a low speed and the host vehicle position acquired from the host vehicle position calculating unit 12 by two-circle intersection processing.

Subsequently, in step ST2, the grouping unit 13 groups the reflection points calculated by the reflection point calculating unit 11 in step ST1. Specifically, for example, when a distance between adjacent reflection points is a value less than a grouping threshold value, the grouping unit 13+ puts these reflection points into an identical group. In contrast, when a distance between adjacent reflection points is a value equal to or more than the grouping threshold value, the grouping unit 13 puts these reflection points into different groups.

Subsequently, in step ST3, the reference distance setting unit 14 sets a reference distance of each reflection point group set by the grouping unit 13 in step ST2. Specifically, for example, the reference distance setting unit 14 calculates a distance value between each of the plurality of reflection points included in each of the plurality of reflection point groups and a host vehicle position, and sets a minimum value out of the calculated values to a reference distance of each of the plurality of reflection point groups.

Subsequently, in step ST4, by comparing the reference distance of each reflection point group set by the reference distance setting unit 14 in step ST3 with the object determining threshold value, the object determining unit 15 determines whether an object corresponding to each reflection point group is a parked vehicle or a parking reference object. Details of processing in ST4 will be described later with reference to the flowchart of FIG. 6.

Subsequently, in step ST5, the parkable area detecting unit 16 detects a parkable area. Details of processing in ST5 will be described later with reference to the flowchart of FIG. 7.

Subsequently, in step ST6, the parkable area detecting unit 16 sets a parking target area. That is, when one parkable area is detected in step ST5, the parkable area detecting unit 16 sets the one parkable area as the parking target area. In contrast, when a plurality of parkable areas is detected in step ST5, the parkable area detecting unit 16 sets one of the plurality of parkable areas as the parking target area. Specifically, for example, the parkable area detecting unit 16 sets a parkable area closest to the current position of the host vehicle 1 among the plurality of parkable areas as the parking target area. Alternatively, for example, the parkable area detecting unit 16 sets a parkable area selected by operation input to an operation input device (not illustrated) among the plurality of parkable areas as the parking target area. The parkable area detecting unit 16 instructs the automatic parking control unit 21 to execute automatic parking in the set parking target area.

Subsequently, in step ST7, the automatic parking control unit 21 executes automatic parking of the host vehicle 1 by controlling a torque of the engine 6, the steering 7, the brake 8, and the like. At this time, the automatic parking control unit 21 guides the host vehicle 1 to the parking target area set by the parkable area detecting unit 16 in step ST6.

Figure 6:
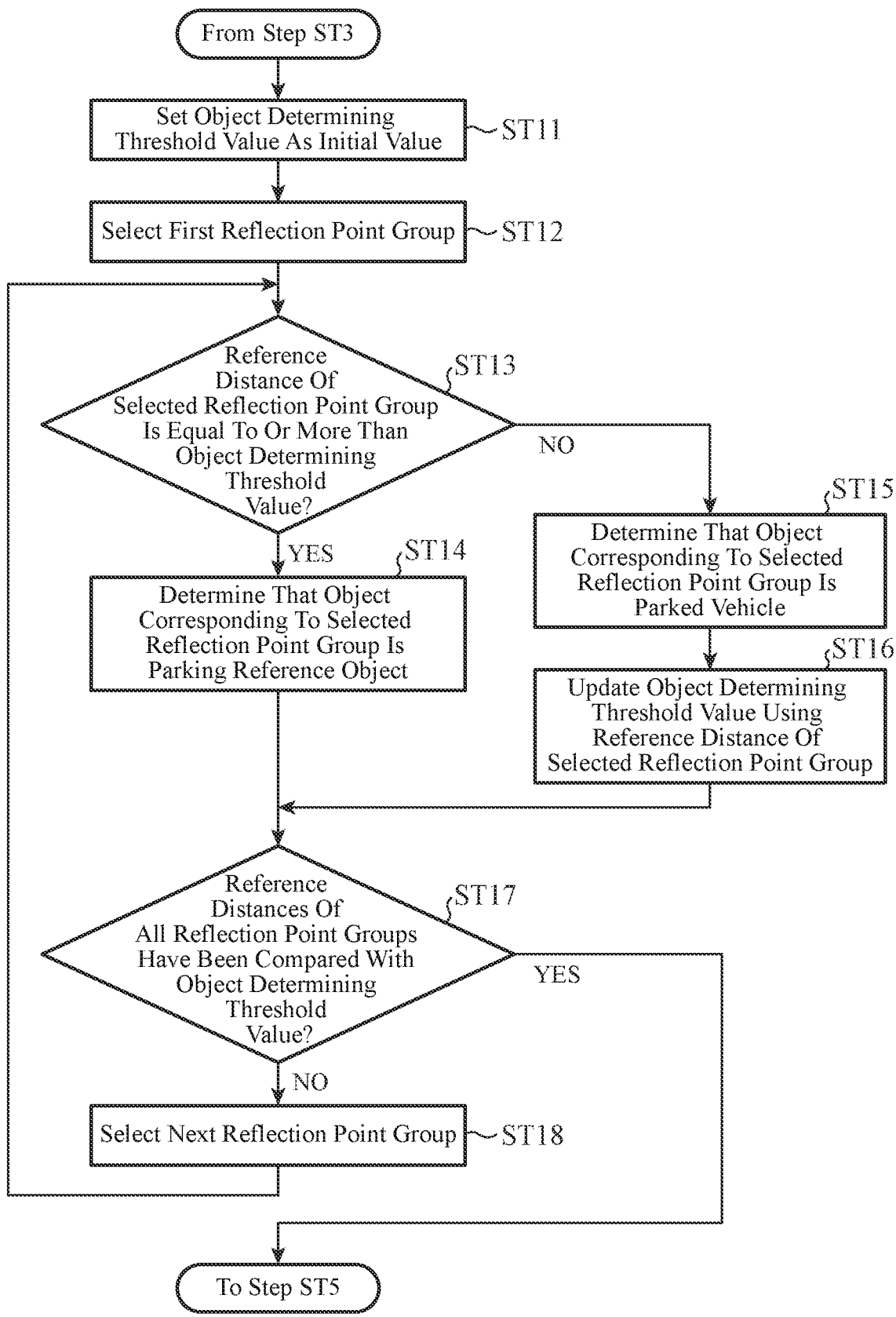
FIG. 6 is a flowchart illustrating detailed operation of an object determining unit according to the first embodiment of the present invention.

Next, details of processing by the object determining unit 15 in step ST4 will be described with reference to the flowchart of FIG. 6.

First, in step ST11, the object determining unit 15 sets the object determining threshold value to a predetermined initial value (for example, a value of equal to one meter or more and equal to two meters or less).

Subsequently, in step ST12, the object determining unit 15 selects a reflection point group initially set among the plurality of reflection point groups set by the grouping unit 13 in step ST2.

Subsequently, in step ST13, the object determining unit 15 compares a reference distance of the reflection point group selected in step ST12 with the object determining threshold value. If the reference distance is a value equal to or more than the object determining threshold value ("YES" in step ST13), in step ST14, the object determining unit 15 determines that an object corresponding to the reflection point group is a parking reference object. In contrast, if the reference distance is a value less than the object determining threshold value ("NO" in step ST13), in step ST15, the object determining unit 15 determines that an object corresponding to the reflection point group is a parked vehicle.

Here, if it is determined that the object is a parked vehicle (step ST15), in step ST16, the object determining unit 15 updates the object determining threshold value. More specifically, the object determining unit 15 sets a value obtained by adding a predetermined value to the reference distance of the reflection point group that has been determined to correspond to a parked vehicle in step ST15, that is, the reference distance of the reflection point group selected in step ST12 as a new object determining threshold value. When the host vehicle 1 executes parallel parking, this predetermined value is set to, for example, about a half value (for example, one meter) of the total width of a general automobile.

Subsequent to step ST14 or step ST16, in step ST17, the object determining unit 15 determines whether or not comparison between the reference distances of all the reflection point groups and the object determining threshold value has been completed. If the comparison between the reference distances of all the reflection point groups and the object determining threshold value has not been completed ("NO" in step ST17), the object determining unit 15 selects a reflection point group set subsequent to the reflection point group the reference distance of which has been compared with the object determining threshold value in the latest step ST13 (step ST18), and returns to step ST13. The object determining unit 15 executes processing in steps ST13 to ST16 similar to the above for the reflection point group selected in step ST18.

In contrast, if the comparison between the reference distances of all the reflection point groups and the object determining threshold value has been completed ("YES" in step ST17), the object determining unit 15 outputs a determination result of each reflection point group to the parkable area detecting unit 16 and terminates the processing.

Next, details of processing by the parkable area detecting unit 16 in step ST5 will be described with reference to the flowchart of FIG. 7.

First, in step ST21, the parkable area detecting unit 16 calculates an interval between reflection point groups that have been determined to correspond to a parked vehicle by the object determining unit 15 in step ST4. The interval corresponds to the width of an area between adjacent parked vehicles (hereinafter referred to as "inter-parked vehicle area"). That is, the object determining unit 15 calculates the width of each inter-parked vehicle area in step ST21.

Subsequently, in step ST22, the parkable area detecting unit 16 compares the width of each inter-parked vehicle area calculated in step ST21 with a predetermined threshold value (hereinafter referred to as "width threshold value"). When the host vehicle 1 executes parallel parking, the width threshold value is set to, for example, a value corresponding to the total length of the host vehicle 1. When the host vehicle 1 executes perpendicular parking, the width threshold value is set to, for example, a value corresponding to the total width of the host vehicle 1.

In step ST23, the parkable area detecting unit 16 calculates an approximate straight line of each reflection point group set by the grouping unit 13 in step ST2. To calculate the approximate straight line, a method such as a so-called "least squares method" or "random sample consensus (RANSAC)" is used.

Subsequently, in step ST24, the parkable area detecting unit 16 calculates an interval between the approximate straight line of the reflection point group that has been determined to correspond to a parked vehicle by the object determining unit 15 in step ST4 and the approximate straight line of the reflection point group that has been determined to correspond to a parking reference object by the object determining unit 15 in step ST4. The interval corresponds to the depth of the inter-parked vehicle area. That is, the object determining unit 15 calculates the depth of each inter-parked vehicle area in step ST24.

Subsequently, in step ST25, the parkable area detecting unit 16 compares the depth of each inter-parked vehicle area calculated in step ST24 with a predetermined threshold value (hereinafter referred to as "depth threshold value"). When the host vehicle 1 executes parallel parking, the depth threshold value is set to, for example, a value corresponding to the total width of the host vehicle 1. When the host vehicle 1 executes perpendicular parking, the depth threshold value is set to, for example, a value corresponding to the total length of the host vehicle 1.

Subsequently, in step ST26, the parkable area detecting unit 16 detects an inter-parked vehicle area having a width equal to or more than the width threshold value and having a depth equal to or more than the depth threshold value as a parkable area using the comparison results in steps ST22 and ST25.

Incidentally, when the host vehicle 1 executes perpendicular parking, the parkable area detecting unit 16 detects, in addition to an inter-parked vehicle area satisfying the conditions of step ST26, also an inter-parked vehicle area the depth of which has not been calculated among inter-parked vehicle areas each having a width equal to or more than the width threshold value, that is, also an inter-parked vehicle area where a parking reference object does not exist as a parkable area.

Figure 9:
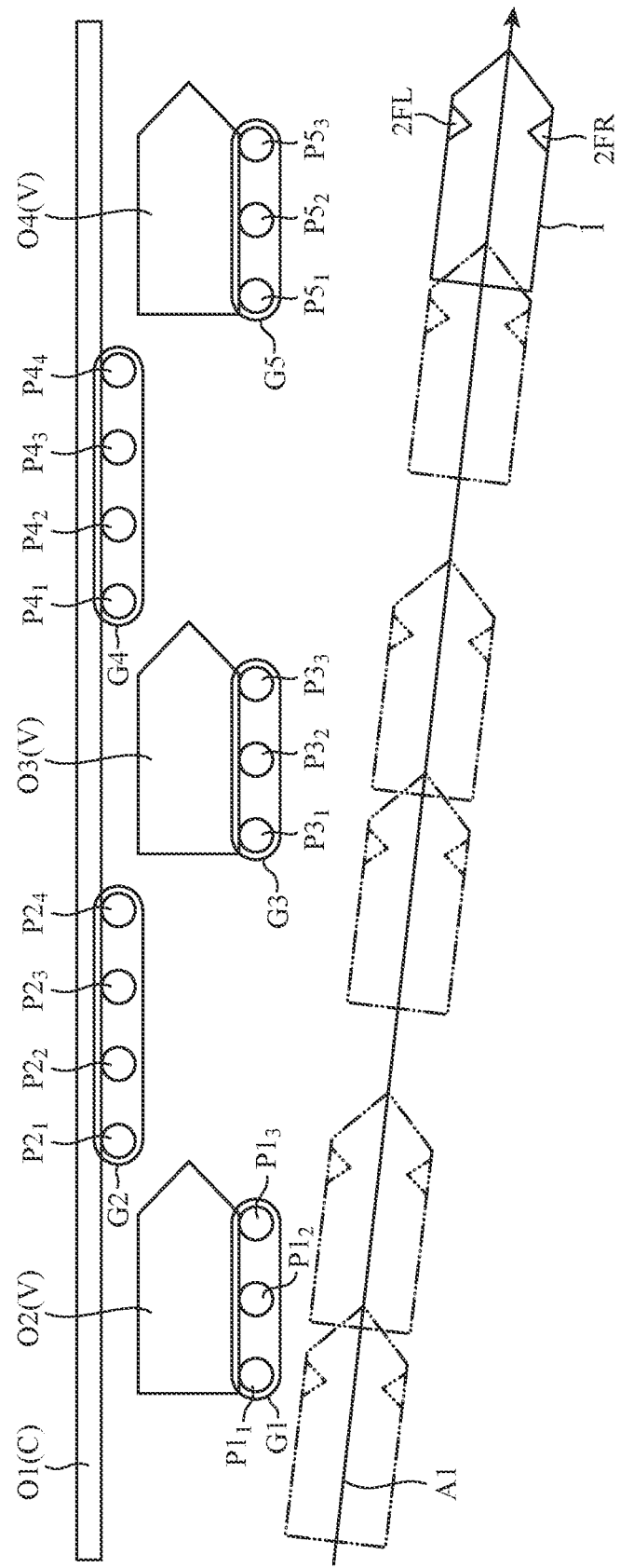
FIG. 9 is an explanatory diagram illustrating a reflection point group and the like set by a grouping unit according to the first embodiment of the present invention.
Figure 10:
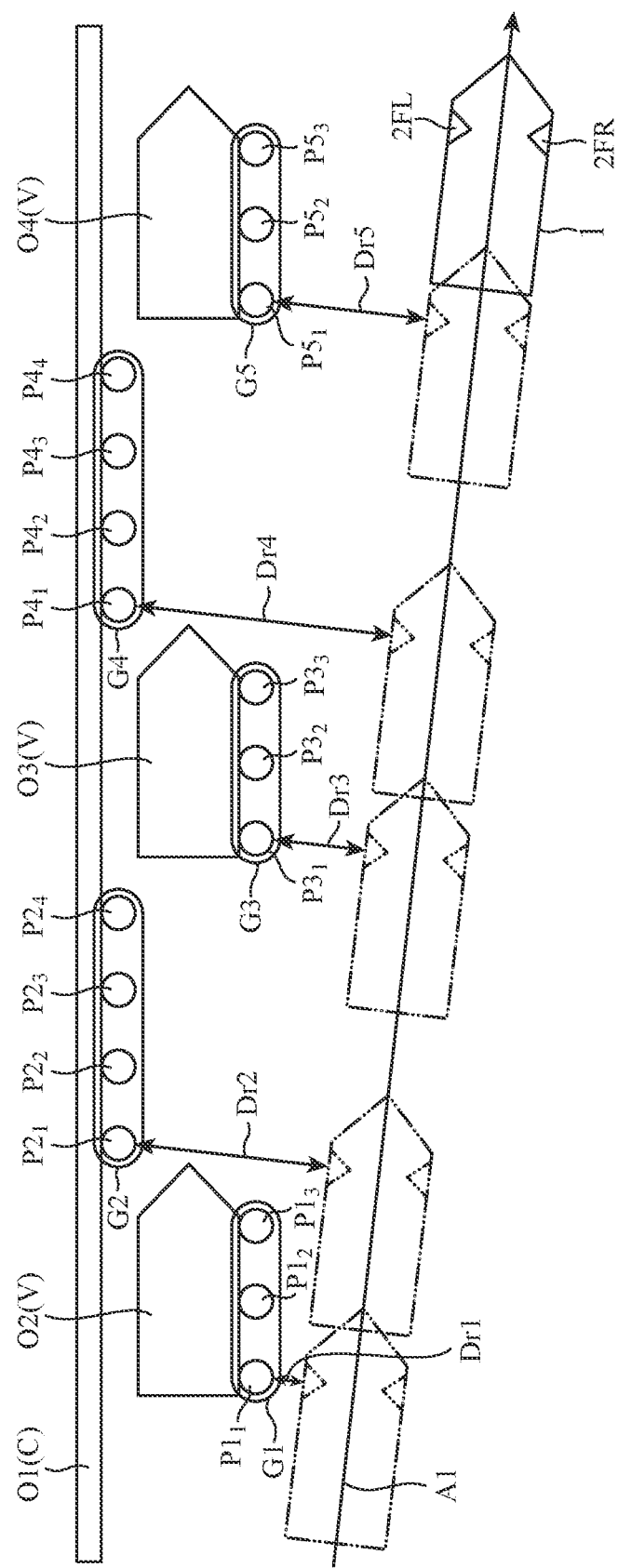
FIG. 10 is an explanatory diagram illustrating a reference distance and the like set by a reference distance setting unit according to the first embodiment of the present invention.

Next, a specific example of processing in steps ST1 to ST3 illustrated in FIG. 5 will be described with reference to FIGS. 8 to 10.

Figure 8:
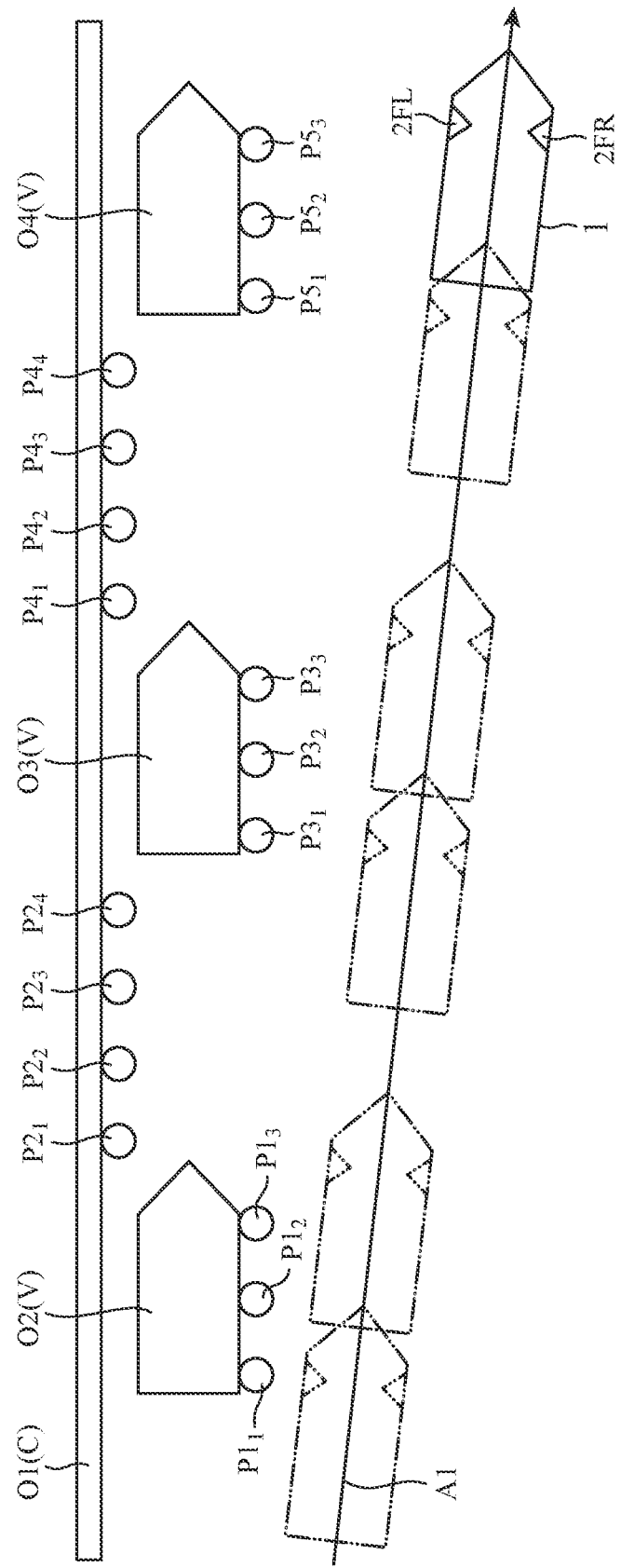
FIG. 8 is an explanatory diagram illustrating a reflection point and the like calculated by a reflection point calculating unit according to the first embodiment of the present invention.

As illustrated in FIG. 8, three parked vehicles V are parked in parallel along a curb C. The host vehicle 1 travels at a low speed so as to execute parallel parking in an area between the parked vehicles V, that is, in an inter-parked vehicle area. At this time, it is assumed that the host vehicle 1 travels diagonally with respect to an arrangement direction of the parked vehicles V, that is, in a direction gradually away from the parked vehicles V. In the drawing, an arrow A1 indicates a traveling path of the host vehicle 1. The host vehicle position calculating unit 12 calculates the position of the host vehicle 1 at each time point during travel at a low speed, that is, the position of the host vehicle 1 at each point along the arrow A1 as a host vehicle position.

An ultrasonic wave transmitted by the distance sensor 2FL during travel along the arrow A1 is reflected by objects O1 to O4 existing on the left side of the host vehicle 1. As a result, the reflection point calculating unit 11 calculates a plurality of reflection points $P1_1$ to $P1_3$, $P2_1$ to $P2_4$, $P3_1$ to $P3_3$, $P4_1$ to $P4_4$, and $P5_1$ to $P5_3$ (step ST1). Here, the object O1 is the curb C, that is, a parking reference object, and each of the objects O2 to O4 is the parked vehicle V.

Subsequently, the grouping unit 13 groups reflection points $P1_1$ to $P1_3$, $P2_1$ to $P2_4$, $P3_1$ to $P3_3$, $P4_1$ to $P4_4$, and $P5_1$ to $P5_3$ (step ST2). By grouping, as illustrated in FIG. 9, a reflection point group G1 including the three reflection points $P1_1$ to $P1_3$, a reflection point group G2 including the four reflection points $P2_1$ to $P2_4$, a reflection point group G3 including the three reflection points $P3_1$ to $P3_3$, a reflection point group G4 including the four reflection points $P4_1$ to $P4_4$, and a reflection point group G5 including the three reflection points $P5_1$ to $P5_3$ are set.

Subsequently, the reference distance setting unit 14 sets reference distances of the reflection point groups G1 to G5 (step ST3). That is, as illustrated in FIG. 10, the reference distance setting unit 14 sets a minimum value among distances between each of the three reflection points $P1_1$ to $P1_3$ included in the reflection point group G1 and a host vehicle position, that is, a distance Dr1 between the reflection point $P1_1$ and a host vehicle position corresponding to the reflection point $P1_1$ as the reference distance of the reflection point group G1. Similarly, the reference distance setting unit 14 sets a distance Dr2 between the reflection point $P2_1$ and a host vehicle position corresponding to the reflection point $P2_1$ as the reference distance of the reflection point group G2, sets a distance Dr3 between the reflection point $P3_1$ and a host vehicle position corresponding to the reflection point $P3_1$ as the reference distance of the reflection point group G3, sets a distance Dr4 between the reflection point $P4_1$ and a host vehicle position corresponding to the reflection point $P4_1$ as the reference distance of the reflection point group G4, and sets a distance Dr5 between the reflection point $P5_1$ and a host vehicle position corresponding to the reflection point $P5_1$ as the reference distance of the reflection point group G5.

Next, a specific example of processing in steps ST11 to ST18 illustrated in FIG. 6 will be described with reference to FIG. 11.

First, the object determining unit 15 sets the object determining threshold value to an initial value Dth0 (step ST11), selects the first reflection point group G1 (step ST12), and compares the reference distance Dr1 of the reflection point group G1 with the object determining threshold value Dth0 (step ST13). Since the reference distance Dr1 is a value less than the object determining threshold value Dth0 ("NO" in step ST13), the object determining unit 15 determines that the object O2 corresponding to the reflection point group G1 is the parked vehicle V (step ST15), and updates the object determining threshold value (step ST16). Specifically, the object determining unit 15 sets a value Dth1 obtained by adding a predetermined value α to the reference distance Dr1 of the reflection point group G1 as a new object determining threshold value. That is, Dth1=Dr1+α, and α is one meter, for example.

Subsequently, the object determining unit 15 selects the next reflection point group G2 (step ST18) and compares the reference distance Dr2 of the reflection point group G2 with the updated object determining threshold value Dth1 (step ST13). Since the reference distance Dr2 is a value equal to or more than the object determining threshold value Dth1 ("YES" in step ST13), the object determining unit 15 determines that the object O1 corresponding to the reflection point group G2 is a parking reference object (step ST14).

Subsequently, the object determining unit 15 selects the next reflection point group G3 (step ST18) and compares the reference distance Dr3 of the reflection point group G3 with the object determining threshold value Dth1 (step ST13). Since the reference distance Dr3 is a value less than the object determining threshold value Dth1 ("NO" in step ST13), the object determining unit 15 determines that the object O3 corresponding to the reflection point group G3 is the parked vehicle V (step ST15), and updates the object determining threshold value (step ST16). Specifically, the object determining unit 15 sets a value Dth2 obtained by adding the predetermined value α to the reference distance Dr3 of the reflection point group G3 as a new object determining threshold value. That is, Dth2=Dr3+α.

Subsequently, the object determining unit 15 selects the next reflection point group G4 (step ST18) and compares the reference distance Dr4 of the reflection point group G4 with the updated object determining threshold value Dth2 (step ST13). Since the reference distance Dr4 is a value equal to or more than the object determining threshold value Dth2 ("YES" in step ST13), the object determining unit 15 determines that the object O1 corresponding to the reflection point group G4 is a parking reference object (step ST14).

Subsequently, the object determining unit 15 selects the next reflection point group G5 (step ST18) and compares the reference distance Dr5 of the reflection point group G5 with the object determining threshold value Dth2 (step ST13). Since the reference distance Dr5 is a value less than the object determining threshold value Dth2 ("NO" in step ST13), the object determining unit 15 determines that the object O4 corresponding to the reflection point group G5 is the parked vehicle V (step ST15), and updates the object determining threshold value (step ST16). Specifically, the object determining unit 15 sets a value Dth3 obtained by adding the predetermined value α to the reference distance Dr5 of the reflection point group G5 as a new object determining threshold value. That is, Dth3=Dr5+α.

Subsequently, since the comparison between the reference distances Dr1 to Dr5 of all the reflection point groups G1 to G5 and the object determining threshold value has been completed ("YES" in step ST17), the object determining unit 15 outputs the above determination result to the parkable area detecting unit 16 and terminates the processing.

In this manner, by comparing the reference distance of each reflection point group with the object determining threshold value, it is possible to determine whether an object existing on the left side of the host vehicle 1 is a parked vehicle or a parking reference object using one distance sensor 2FL. Therefore, compared with the parking assistance device disclosed in Patent Literature 1 using two distance sensors having different detectable ranges in the height direction, it is possible to reduce the minimum number of distance sensors required for determining whether an object existing on the left side of the host vehicle 1 is a parked vehicle or a parking reference object. Similarly, it is possible to reduce the minimum number of distance sensors required for determining whether an object existing on the right side of the host vehicle 1 is a parked vehicle or a parking reference object. As a result, it is possible to easily secure an installation space of the distance sensors in the host vehicle 1.

In addition, by update of the object determining threshold value, even when the host vehicle 1 travels diagonally with respect to an arrangement direction of parked vehicles, it is possible to exactly determine whether an object corresponding to each reflection point group is a parked vehicle or a parking reference object.

Figure 11:
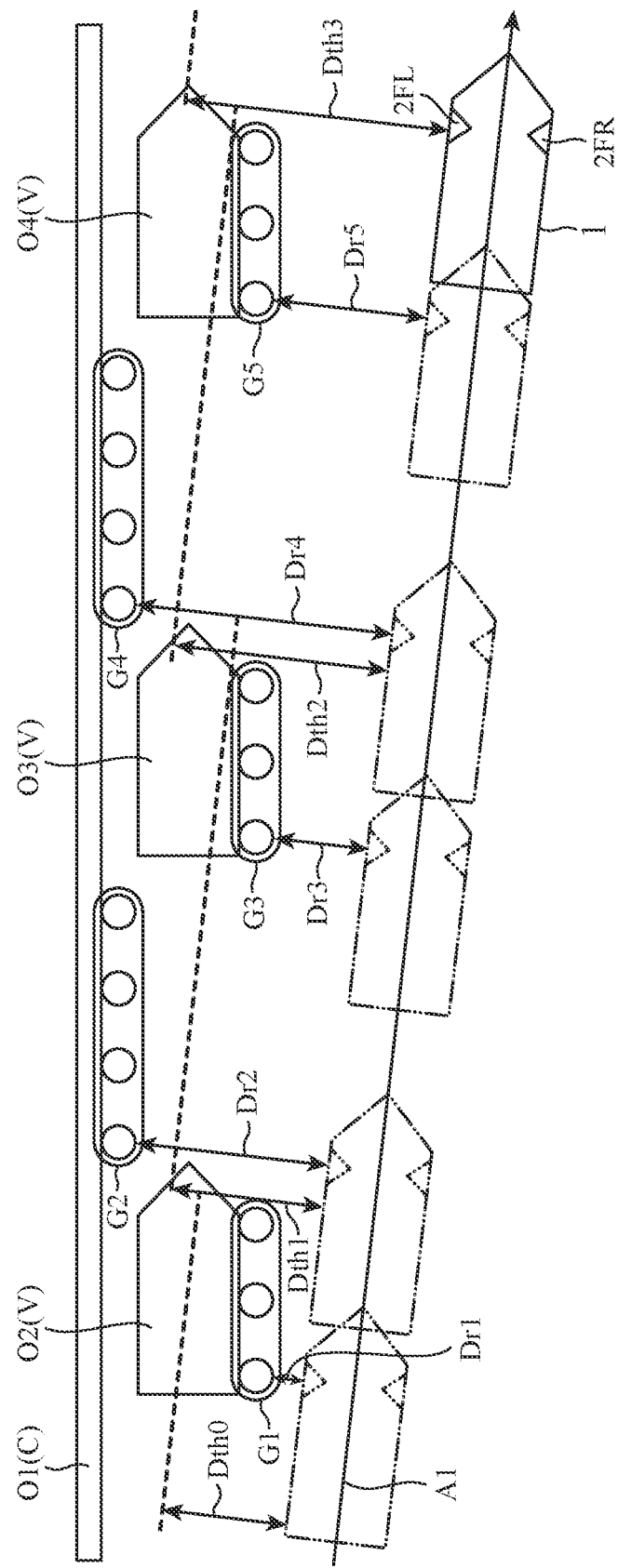
FIG. 11 is an explanatory diagram illustrating an object determining threshold value and the like set by an object determining unit according to the first embodiment of the present invention.
Figure 12:
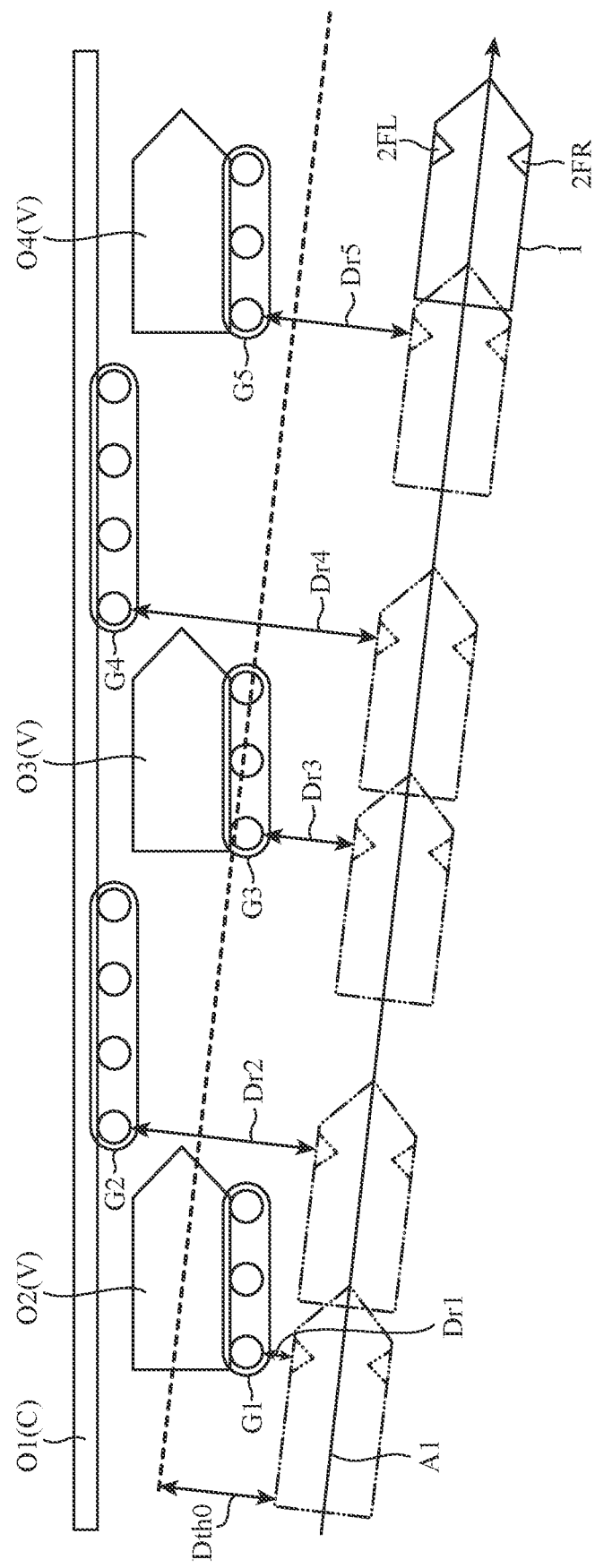
FIG. 12 is an explanatory diagram illustrating an object determining threshold value and the like supposing the object determining unit does not update the object determining threshold value.

For example, in a state similar to the example illustrated in FIG. 11, supposing the object determining threshold value is not updated but is constant at the initial value Dth0, as illustrated in FIG. 12, the reference distance Dr5 of the reflection point group G5 is a value equal to or more than the object determining threshold value Dth0. In this case, although the object O4 corresponding to the reflection point group G5 is the parked vehicle V, the object O4 is determined to be a parking reference object, and erroneous determination occurs. By update of the object determining threshold value, occurrence of such erroneous determination can be suppressed.

Next, a specific example of processing in steps ST21 to ST26 illustrated in FIG. 7 will be described with reference to FIG. 13.

First, the parkable area detecting unit 16 calculates an interval ΔW1 between the reflection point groups G1 and G3 that have been determined to correspond to the parked vehicle V in step ST4, that is, the interval ΔW1 between the reflection points $P1_3$ and $P3_1$ (step ST21). This interval ΔW1 corresponds to the width of an inter-parked vehicle area S1. In addition, the parkable area detecting unit 16 calculates an interval ΔW2 between the reflection point groups G3 and G5 that have been determined to correspond to the parked vehicle V in step ST4, that is, the interval ΔW2 between the reflection points $P3_3$ and $P5_1$ (step ST21). This interval ΔW2 corresponds to the width of an inter-parked vehicle area S2.

Figure 13:
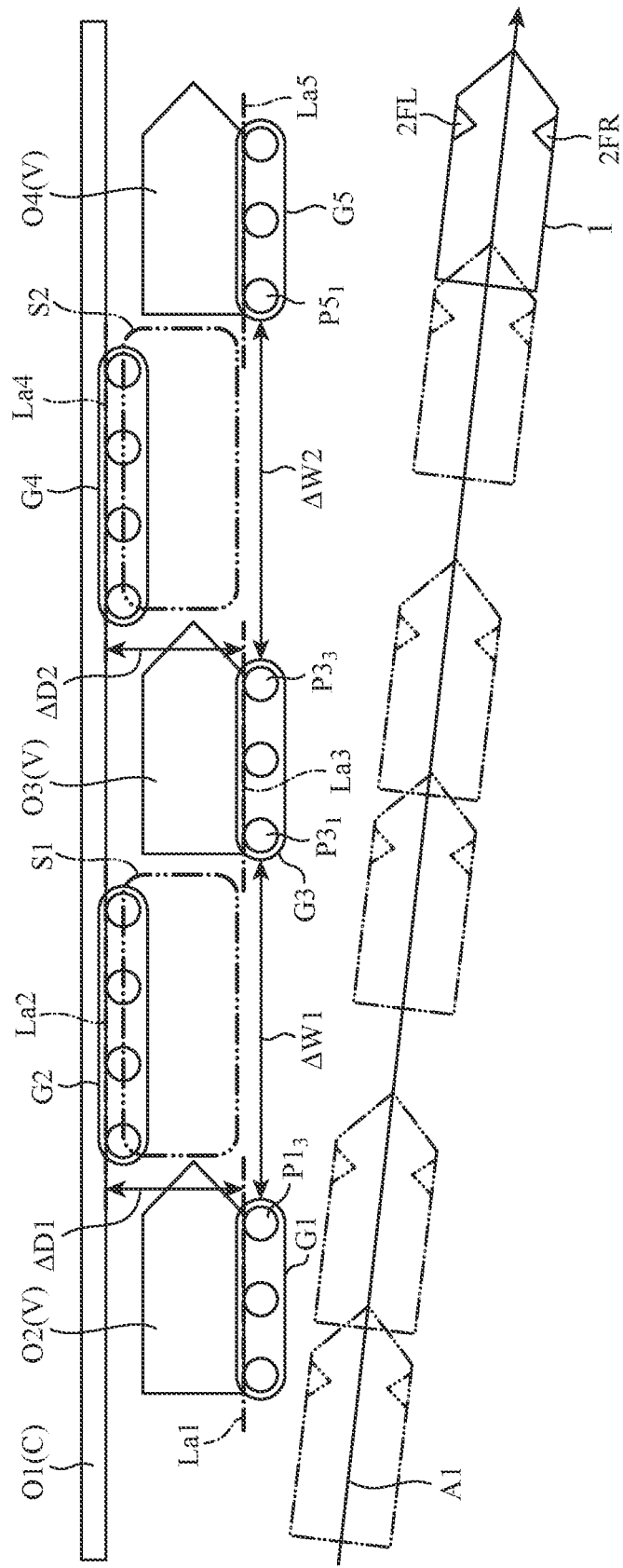
FIG. 13 is an explanatory diagram illustrating the parkable area and the like detected by a parkable area detecting unit according to the first embodiment of the present invention.

Incidentally, in FIG. 13, the width of the reflection point group corresponding to the parked vehicle V is smaller than the total length of the parked vehicle V. Thus, in the illustration, the interval ΔW1 is larger than the width of the inter-parked vehicle area S1, and the interval ΔW2 is larger than the width of the inter-parked vehicle area S2. However, actually, the width of the reflection point group corresponding to the parked vehicle V is slightly larger than the total length of the parked vehicle V due to the nature of an ultrasonic wave, two-circle intersection processing, or the like. Therefore, the interval ΔW1 is a value substantially equal to the width of the inter-parked vehicle area S1 or a value slightly smaller than the width of the inter-parked vehicle area S1, that is, a value corresponding to the width of the inter-parked vehicle area S1. The interval ΔW2 is a value substantially equal to the width of the inter-parked vehicle area S2 or a value slightly smaller than the width of the inter-parked vehicle area S2, that is, a value corresponding to the width of the inter-parked vehicle area S2.

Subsequently, the parkable area detecting unit 16 compares the width ΔW1 of the inter-parked vehicle area S1 with a width threshold value θW for parallel parking, and compares the width ΔW2 of the inter-parked vehicle area S2 with the width threshold value θW for parallel parking (step ST22). In the example illustrated in FIG. 13, the width ΔW1 of the inter-parked vehicle area S1 is a value equal to or more than the width threshold value θW (ΔW1≥θW), and the width ΔW2 of the inter-parked vehicle area S2 is a value equal to or more than the width threshold value θW (ΔW2≥θW).

In addition, the parkable area detecting unit 16 calculates approximate straight lines La1 to La5 of the reflection point groups G1 to G5 (step ST23).

Subsequently, the parkable area detecting unit 16 calculates an interval ΔD1 between the approximate straight line La1 of the reflection point group G1 that has been determined to correspond to the parked vehicle V in step ST4 and the approximate straight line La2 of the reflection point group G2 that has been determined to correspond to a parking reference object in step ST4 (step ST24). This interval ΔD1 corresponds to the depth of the inter-parked vehicle area S1. In addition, the parkable area detecting unit 16 calculates an interval ΔD2 between the approximate straight line La3 of the reflection point group G3 that has been determined to correspond to the parked vehicle V in step ST4 and the approximate straight line La4 of the reflection point group G4 that has been determined to correspond to a parking reference object in step ST4 (step ST24). This interval ΔD2 corresponds to the depth of the inter-parked vehicle area S2.

Subsequently, the parkable area detecting unit 16 compares the depth ΔD1 of the inter-parked vehicle area S1 with a depth threshold value OD for parallel parking, and compares the depth ΔD2 of the inter-parked vehicle area S2 with the depth threshold value OD for parallel parking (step ST25). In the example illustrated in FIG. 13, the depth ΔD1 of the inter-parked vehicle area S1 is a value equal to or more than the depth threshold value θD (ΔD1≥θD), and the depth ΔD2 of the inter-parked vehicle area S2 is a value equal to or more than the depth threshold value θD (ΔD2≥θD).

Subsequently, the parkable area detecting unit 16 detects the inter-parked vehicle area S1 having the width ΔW1 equal to or more than the width threshold value θW and having the depth ΔD1 equal to or more than the depth threshold value θD as a parkable area (step ST26). In addition, the parkable area detecting unit 16 detects the inter-parked vehicle area S2 having the width ΔW2 equal to or more than the width threshold value θW and having the depth ΔD2 equal to or more than the depth threshold value θD as a parkable area (step ST26).

In this case, in step ST6, the parkable area detecting unit 16 sets one of the two parkable areas S1 and S2 as a parking target area. Specifically, for example, the parkable area detecting unit 16 sets the parkable area S2 closer to the current position of the host vehicle 1 out of the two parkable areas S1 and S2 as the parking target area.

Note that the object determining unit 15 may calculate the width of each reflection point group (hereinafter referred to as "group width") and may determine that only a reflection point group having a group width equal to or more than a predetermined threshold value (hereinafter referred to as "group width threshold value") among reflection point groups each having a reference distance equal to or more than the object determining threshold value corresponds to a parking reference object. As a result, it is possible to prevent occurrence of erroneous determination that a reflection point group corresponding to a pole or the like disposed between parked vehicles is a reflection point group corresponding to a parking reference object such as a curb or a wall.

Figure 14:
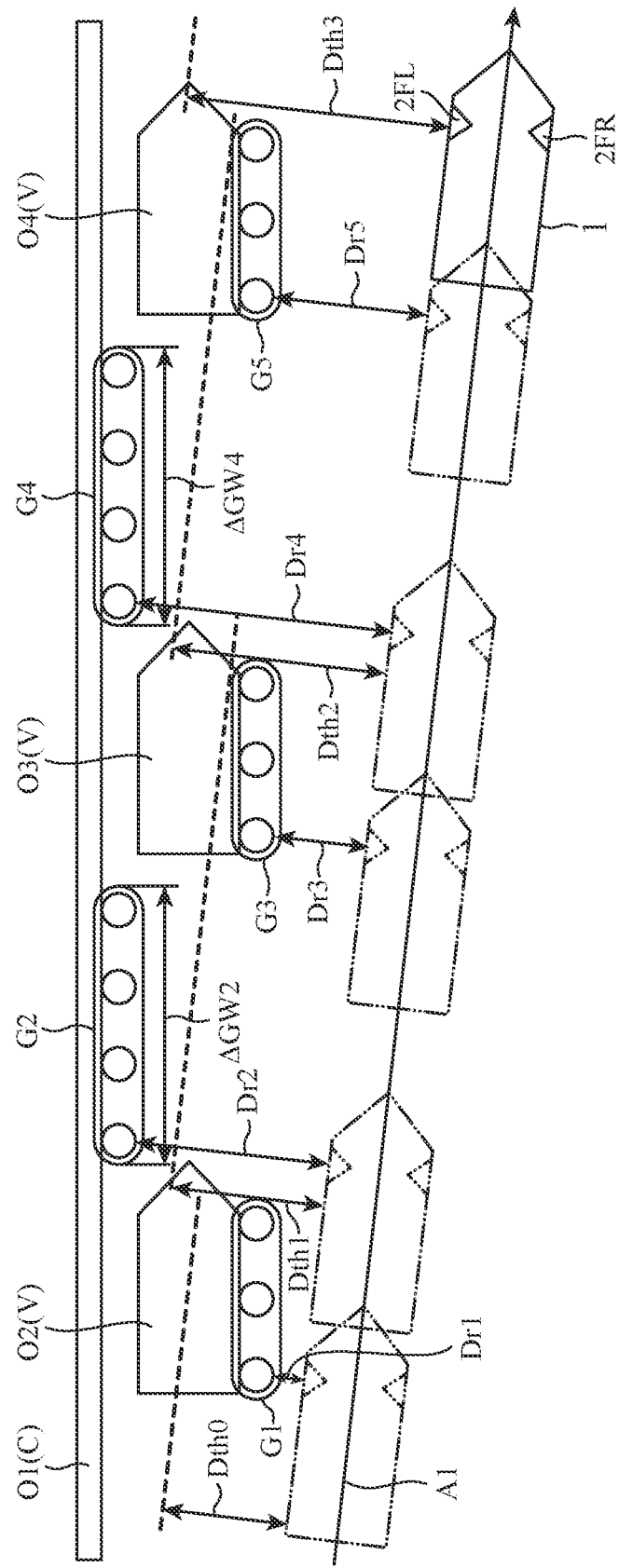
FIG. 14 is an explanatory diagram illustrating a group width and the like calculated by the object determining unit according to the first embodiment of the present invention.

For example, as illustrated in FIG. 14, when the object determining unit 15 determines that the reference distance Dr2 of the reflection point group G2 is a value equal to or more than the object determining threshold value Dth1 ("YES" in step ST13), the object determining unit 15 calculates the group width ΔGW2 of the reflection point group G2. When the group width ΔGW2 is a value equal to or more than the group width threshold value θGW (ΔGW2≥θGW), the object determining unit 15 proceeds to step ST14 and determines that the reflection point group G2 is a reflection point group corresponding to a parking reference object. In contrast, when the group width ΔGW2 is less than the group width threshold value θGW (ΔGW2<θGW), the object determining unit 15 skips step ST14 and proceeds to step ST17. A flowchart in this case is not illustrated.

Similarly, when the object determining unit 15 determines that the reference distance Dr4 of the reflection point group G4 is a value equal to or more than the object determining threshold value Dth2 ("YES" in step ST13), the object determining unit 15 calculates the group width ΔGW4 of the reflection point group G4. When the group width ΔGW4 is a value equal to or more than the group width threshold value θGW (ΔGW4≥θGW), the object determining unit 15 proceeds to step ST14 and determines that the reflection point group G4 is a reflection point group corresponding to a parking reference object. In contrast, when the group width ΔGW4 is a value less than the group width threshold value θGW (ΔGW4<θGW), the object determining unit 15 skips step ST14 and proceeds to step ST17. A flowchart in this case is not illustrated.

The reference distance setting unit 14 may calculate a distance between each of the plurality of reflection points included in each of the plurality of reflection point groups and a host vehicle position, and may set a central value or an average value of the calculated distances as a reference distance of each of the plurality of reflection point groups. In the processing of setting a minimum value among the calculated distances as a reference distance, when a reflection point corresponding to the minimum value (for example, the reflection points $P1_1$, $P2_1$, $P3_1$, $P4_1$, or $P5_1$ illustrated in FIG. 10) is generated by a noise component such as a road surface echo, the reference distance may be an abnormal value, and the object determining unit 15 may cause erroneous determination. By setting the central value or the average value of the calculated distances as a reference distance, occurrence of such erroneous determination can be suppressed.

In addition, the reflection point calculating unit 11 may store a distance range in which an object can be detected by the distance sensors 2FL and 2FR (hereinafter referred to as "detectable range") in advance. By outputting only a reflection point indicating a position within the detectable range among the reflection points calculated by two-circle intersection processing to the grouping unit 13, the reflection point calculating unit 11 may exclude a reflection point indicating a position outside the detectable range from a grouping target. As a result, a reflection point generated by a noise component such as road surface echo can be excluded from the grouping target, and the reliability of determination by the object determining unit 15 can be improved.

Figure 15:
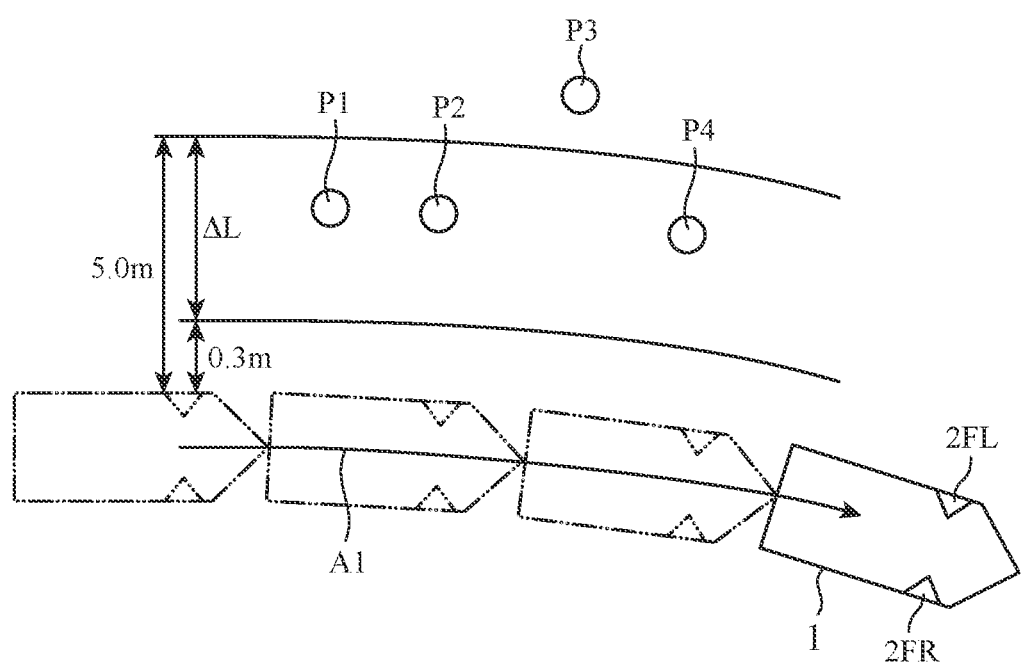
FIG. 15 is an explanatory diagram illustrating a detectable range and the like by the distance sensor according to the first embodiment of the present invention.

For example, as illustrated in FIG. 15, it is assumed that a distance range of 0.3 meters to 5.0 meters is set as a detectable range ΔL, the reflection point calculating unit 11 calculates the four reflection points P1 to P4 by two-circle intersection processing while the host vehicle 1 is traveling along the arrow A1, and one reflection point P3 among these points indicates a position outside the detectable range ΔL. In this case, by outputting only the three reflection points P1, P2, and P4 indicating positions within the detectable range ΔL to the grouping unit 13, the reflection point calculating unit 11 excludes the reflection point P3 from the grouping target.

Figure 16:
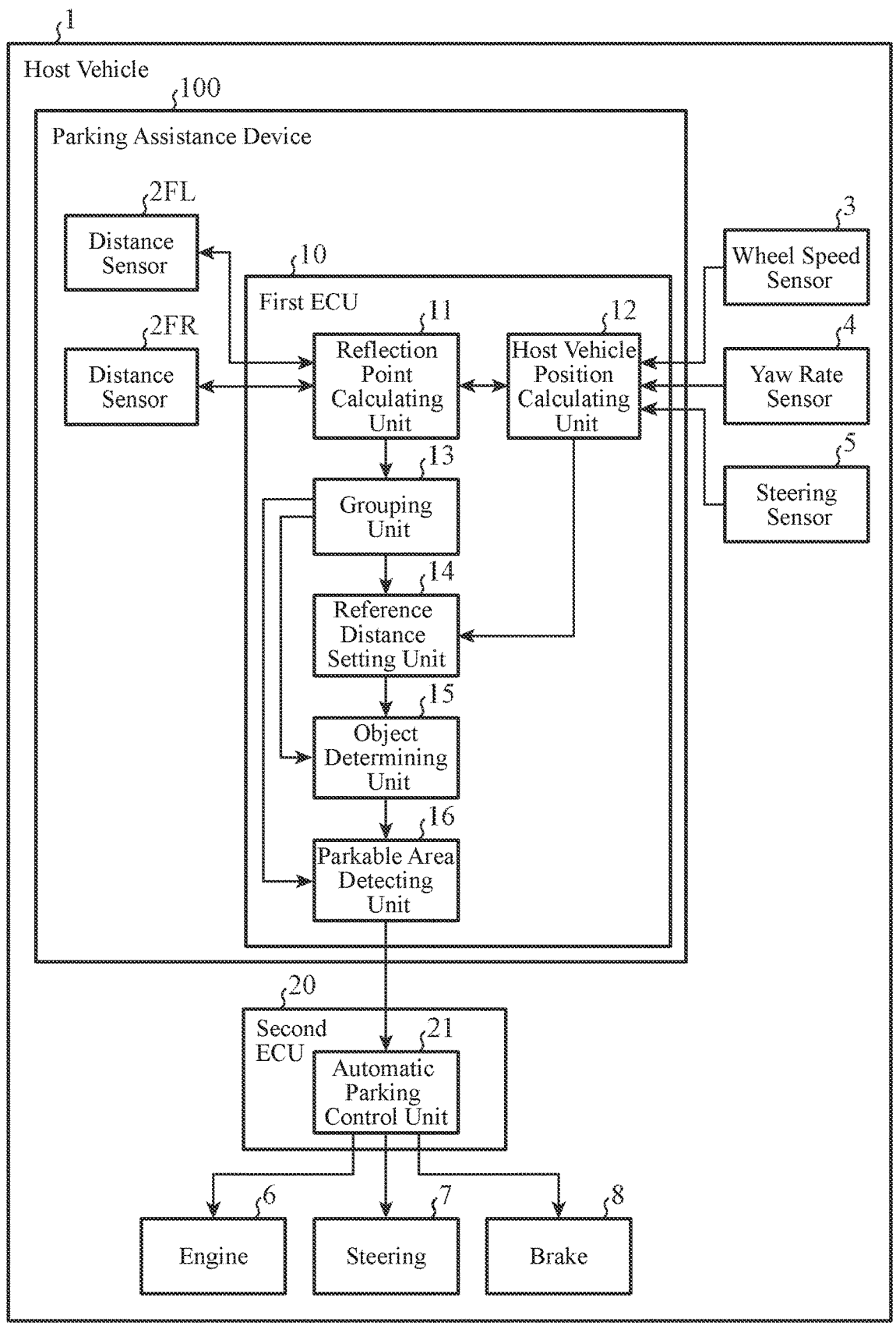
FIG. 16 is a functional block diagram illustrating a state in which another parking assistance device according to the first embodiment of the present invention is mounted on a host vehicle.

As illustrated in FIG. 16, the parking assistance device 100 may be a device not including the automatic parking control unit 21.

Figure 17:
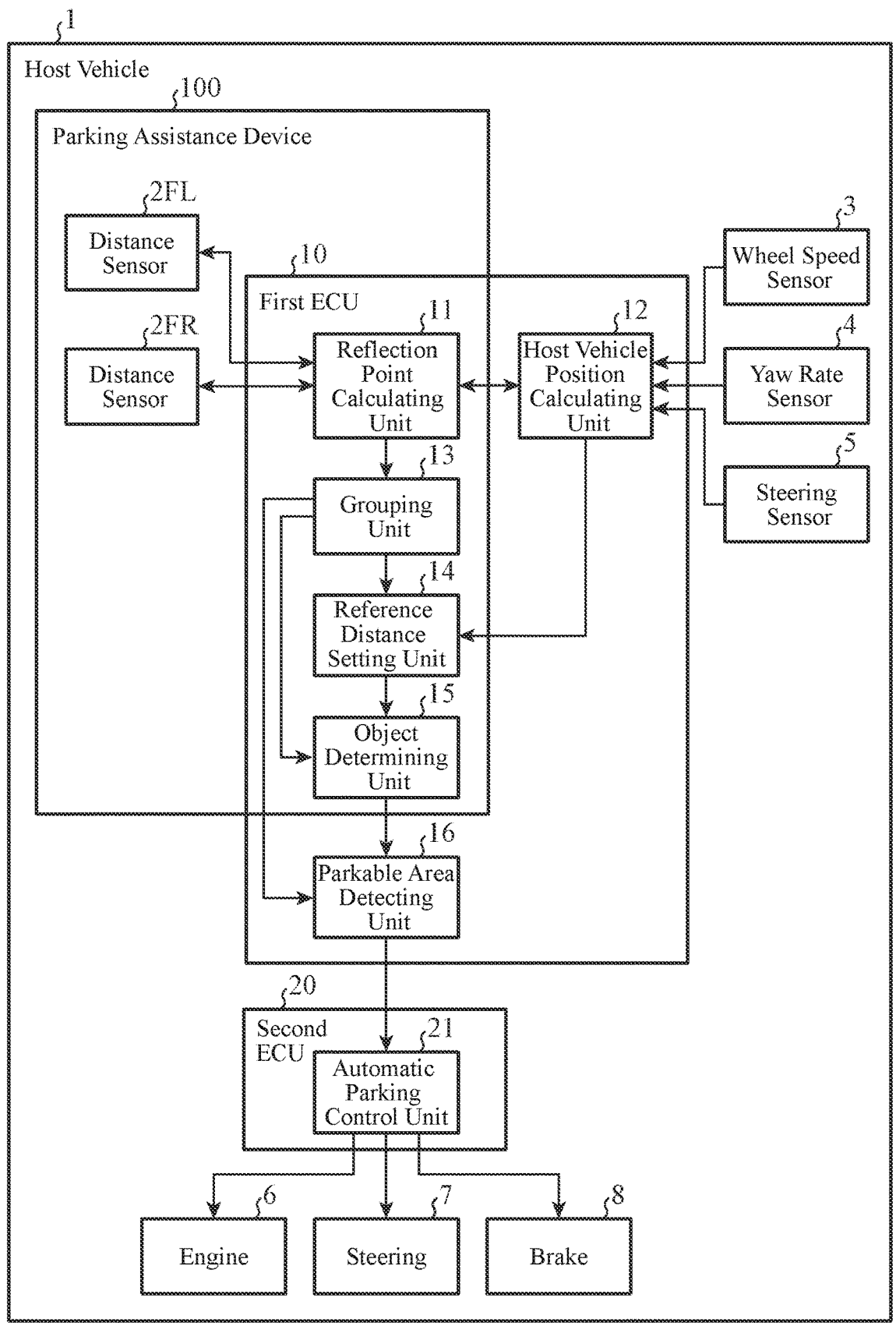
FIG. 17 is a functional block diagram illustrating a state in which another parking assistance device according to the first embodiment of the present invention is mounted on a host vehicle.

Alternatively, as illustrated in FIG. 17, the parking assistance device 100 may be a device not including the host vehicle position calculating unit 12, the parkable area detecting unit 16, or the automatic parking control unit 21. In this case, the host vehicle position calculating unit 12 may be provided outside the first ECU 10 (for example, may be provided in the second ECU 20, another electronic control unit (not illustrated), or a navigation device (not illustrated)). The parkable area detecting unit 16 may be provided outside the first ECU 10 (for example, may be provided in the second ECU 20 or another electronic control unit (not illustrated)).

Figure 18:
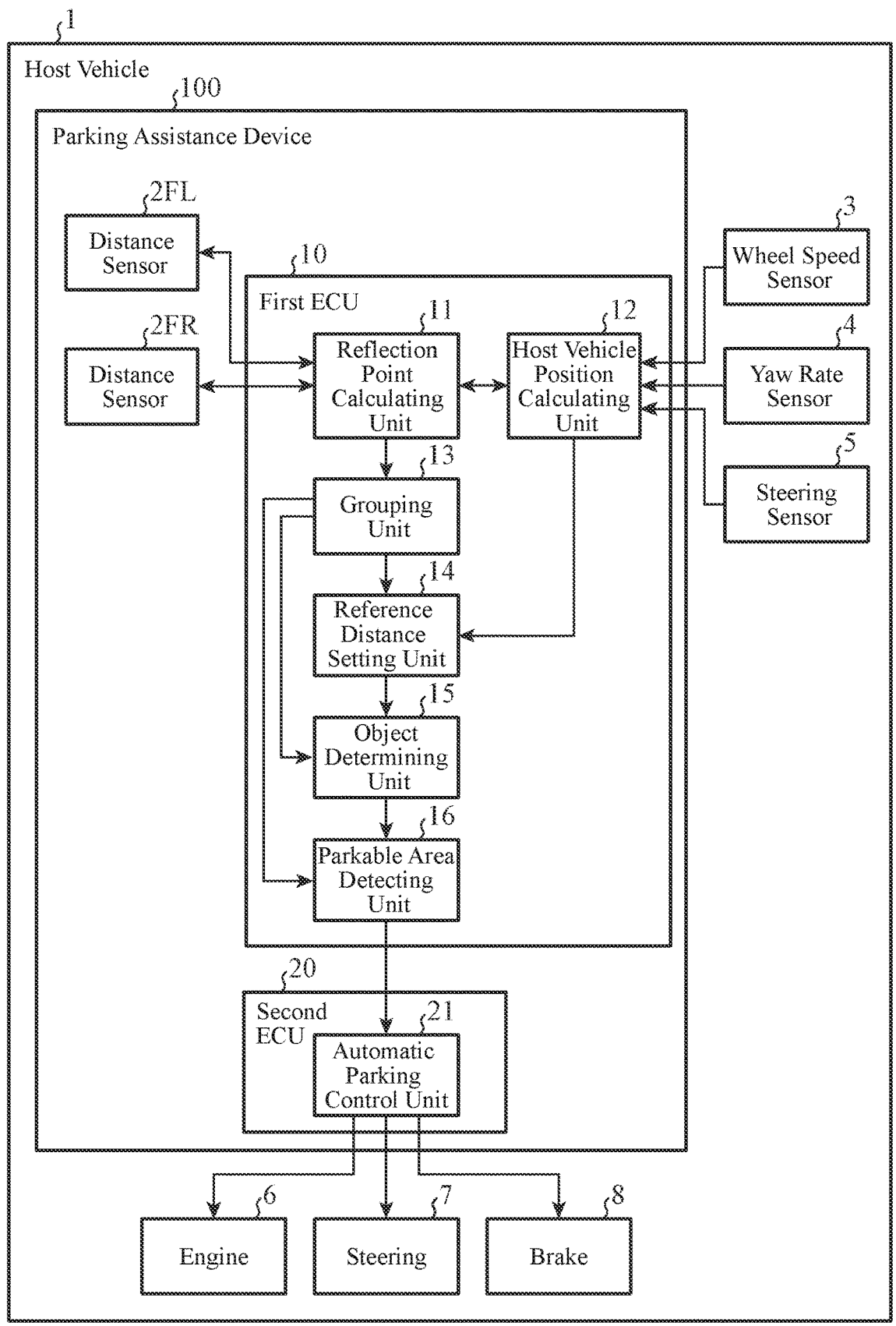
FIG. 18 is a functional block diagram illustrating a state in which another parking assistance device according to the first embodiment of the present invention is mounted on a host vehicle.
Figure 19:
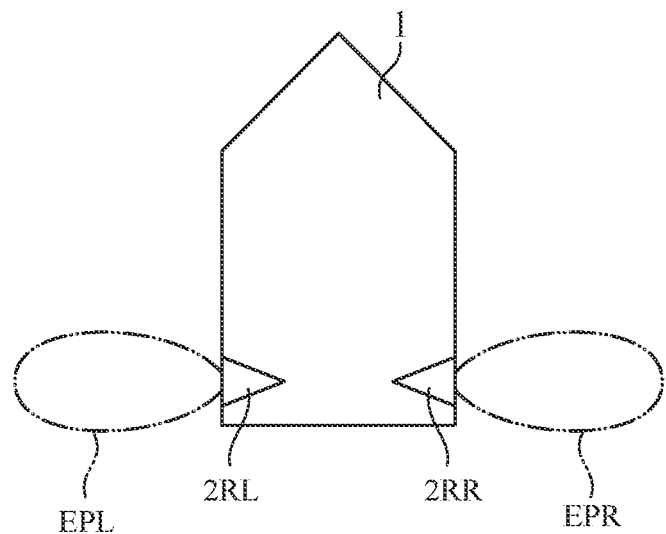
FIG. 19 is an explanatory diagram illustrating arrangement of other distance sensors in the host vehicle according to the first embodiment of the present invention.

The position where a distance sensor is provided in the host vehicle 1 is not limited to the front half portion of the host vehicle 1. For example, as illustrated in FIGS. 18 and 19, one distance sensor 2RL may be provided on the left side portion of the rear half portion of the host vehicle 1, and one distance sensor 2RR may be provided on the right side portion of the rear half portion of the host vehicle 1.

Figure 20:
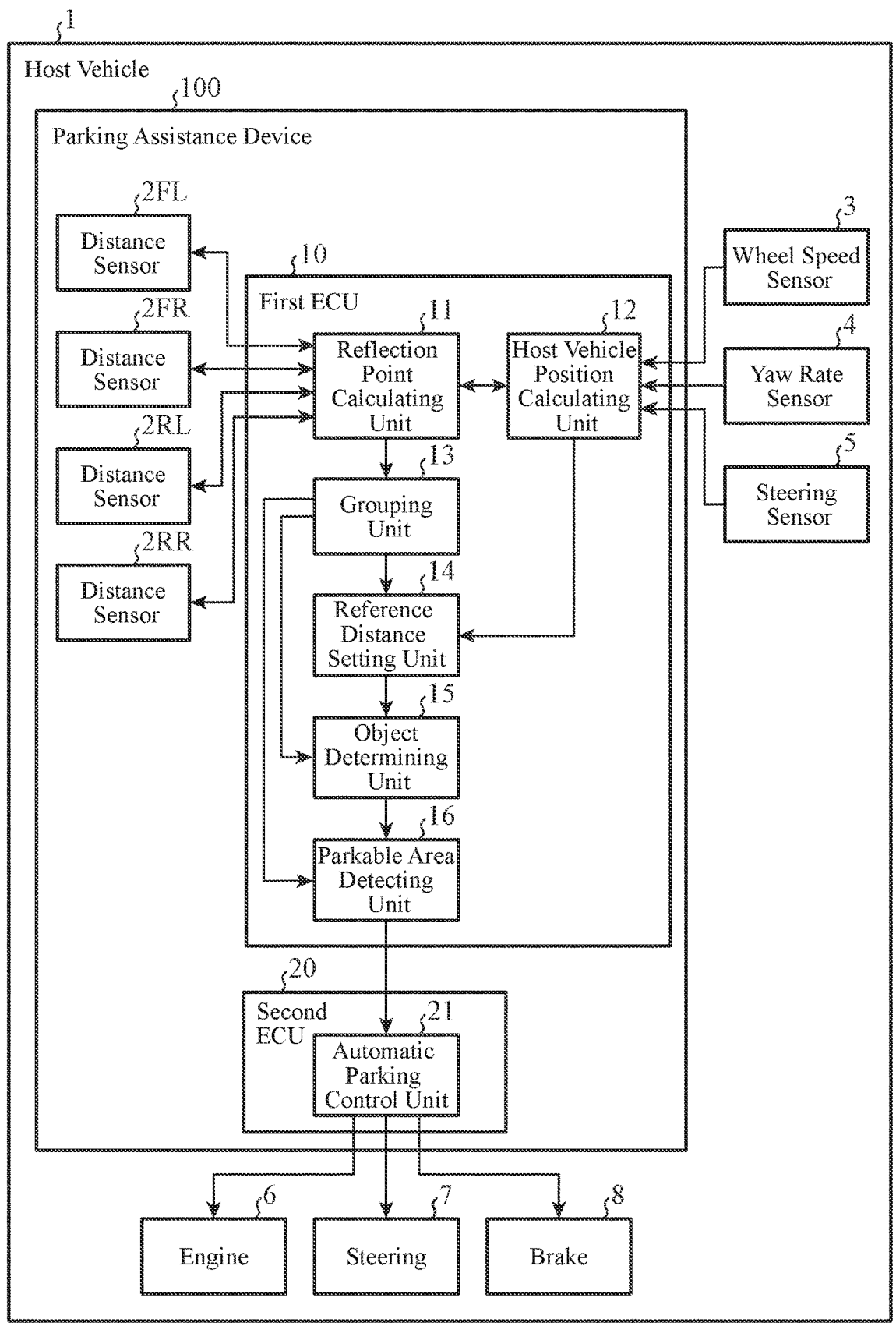
FIG. 20 is a functional block diagram illustrating a state in which another parking assistance device according to the first embodiment of the present invention is mounted on a host vehicle.
Figure 21:
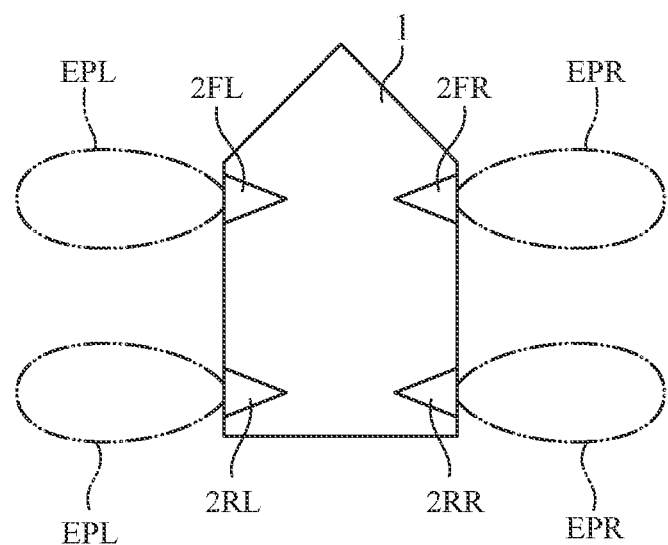
FIG. 21 is an explanatory diagram illustrating arrangement of other distance sensors in the host vehicle according to the first embodiment of the present invention.

Alternatively, for example, as illustrated in FIGS. 20 and 21, one distance sensor 2FL may be provided on the left side portion of the front half portion of the host vehicle 1, one distance sensor 2FR may be provided on the right side portion of the front half portion of the host vehicle 1, one distance sensor 2RL may be provided on the left side portion of the rear half portion of the host vehicle 1, and one distance sensor 2RR may be provided on the right side portion of the rear half portion of the host vehicle 1. In this case, the distance sensors 2FL and 2RL provided on the left side portion of the host vehicle 1 are set within a range in which the detectable ranges thereof in the height direction are substantially equal to each other. The distance sensors 2FR and 2RR provided on the right side portion of the host vehicle 1 are set within a range in which the detectable ranges thereof in the height direction are substantially equal to each other.

The distance sensors 2FL, 2FR, 2RL, and 2RR may transmit and receive a radio wave in a millimeter wave band or a laser beam instead of an ultrasonic wave.

As described above, the parking assistance device 100 according to the first embodiment includes: distance sensors 2FL, 2FR, 2RL, and 2RR for transmitting detection waves toward a side of the host vehicle 1 while the host vehicle 1 is traveling and receiving reflected waves of the detection waves; the reflection point calculating unit 11 for calculating reflection points indicating positions where the detection waves have been reflected; the grouping unit 13 for grouping the reflection points; the reference distance setting unit 14 for setting a reference distance corresponding to a distance between a host vehicle position indicating the position of the traveling host vehicle 1 and the reflection point group set by grouping; and the object determining unit 15 for setting the object determining threshold value to be compared with the reference distance and determining whether an object corresponding to the reflection point group is a parked vehicle or a parking reference object by comparing the reference distance with the object determining threshold value. As a result, it is possible to determine whether an object detected using the distance sensors 2FL, 2FR, 2RL, and 2RR is a parked vehicle or a parking reference object, and to easily secure an installation space of the distance sensors 2FL, 2FR, 2RL, and 2RR in the host vehicle 1.

The object determining unit 15 sets the object determining threshold value using the reference distance of the reflection point group that has been determined to correspond to a parked vehicle. As a result, it is possible to set the object determining threshold value to an appropriate value. As a result, reliability of determination by the object determining unit 15 can be improved.

In addition, the object determining unit 15 updates the object determining threshold value each time the object determining unit 15 determines that an object is a parked vehicle. As a result, it is possible to suppress occurrence of erroneous determination due to the host vehicle 1 traveling diagonally with respect to the arrangement direction of parked vehicles. As a result, reliability of determination by the object determining unit 15 can be further improved.

In addition, the object determining unit 15 calculates a group width which is the width of a reflection point group and determines that a reflection point group having a group width equal to or more than the group width threshold value among reflection point groups each having a reference distance equal to or more than the object determining threshold value corresponds to a parking reference object. As a result, it is possible to prevent occurrence of erroneous determination that a reflection point group corresponding to a pole or the like provided between parked vehicles is a reflection point group corresponding to a parking reference object such as a curb or a wall. As a result, reliability of determination by the object determining unit 15 can be further improved.

The reference distance setting unit 14 calculates a distance between each of the plurality of reflection points included in a reflection point group and a host vehicle position, and sets a minimum value among the calculated distances as a reference distance. As a result, it is possible to calculate a value corresponding to a distance between the host vehicle position and each reflection point group, that is, a reference distance.

Alternatively, the reference distance setting unit 14 calculates a distance between each of a plurality of reflection points included in a reflection point group and a host vehicle position, and sets a central value or an average value of the calculated distances as a reference distance. As a result, even when a reflection point corresponding to a minimum value among the calculated distances is generated by a noise component, it is possible to prevent a reference distance from becoming an abnormal value. As a result, reliability of determination by the object determining unit 15 can be further improved.

In addition, the reflection point calculating unit 11 calculates a reflection point by two-circle intersection processing, and excludes a reflection point indicating a position outside the detectable range by the distance sensors 2FL, 2FR, 2RL, and 2RR from the grouping target. As a result, it is possible to exclude a reflection point generated by a noise components from the grouping target. As a result, reliability of determination by the object determining unit 15 can be further improved.

One distance sensor 2FL is provided on the left side portion of the front half portion of the host vehicle 1, and one distance sensor 2FR is provided on the right side portion of the front half portion of the host vehicle 1. Alternatively, one distance sensor 2RL is provided on the left side portion of the rear half portion of the host vehicle 1, and one distance sensor 2RR is provided on the right side portion of the rear half portion of the host vehicle 1. As a result, it is possible to easily secure an installation space of the distance sensors 2FL, 2FR, 2RL, and 2RR in the host vehicle 1 while making it possible to detect objects existing on the left and right sides of the host vehicle 1.

Second Embodiment

Figure 22:
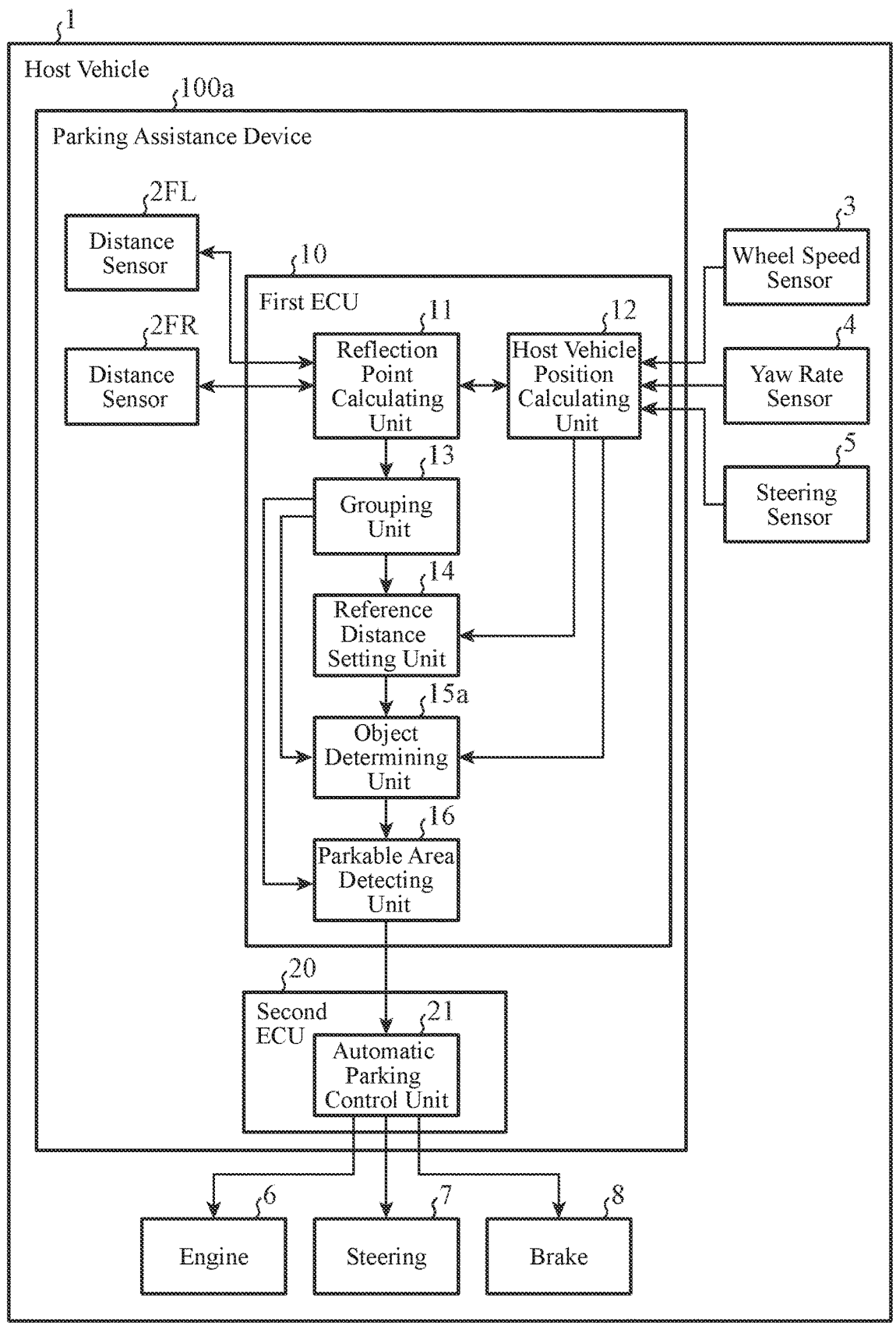
FIG. 22 is a functional block diagram illustrating a state in which a parking assistance device according to a second embodiment of the present invention is mounted on a host vehicle.

FIG. 22 is a functional block diagram illustrating a state in which a parking assistance device according to a second embodiment of the present invention is mounted on a host vehicle. A parking assistance device 100a according to the second embodiment will be described with reference to FIG. 22.

Incidentally, in FIG. 22, the same reference numerals are given to blocks similar to those in the functional block diagram of the first embodiment illustrated in FIG. 1, and description thereof will be omitted. In addition, since arrangement of distance sensors 2FL and 2FR in a host vehicle 1 is similar to that described in the first embodiment with reference to FIG. 2, illustration thereof and description thereof will be omitted. Since the hardware configuration of a first ECU 10 is similar to that described with reference to FIG. 3 in the first embodiment, illustration thereof and explanation thereof will be omitted. Since the hardware configuration of a second ECU 20 is similar to that described with reference to FIG. 4 in the first embodiment, illustration thereof and explanation thereof will be omitted.

By comparing a reference distance of each reflection point group set by a reference distance setting unit 14 with the object determining threshold value, an object determining unit 15a determines whether an object corresponding to each reflection point group is a parked vehicle or a parking reference object. Here, the object determining unit 15a determines whether an object is a parked vehicle or a parking reference object by a method different from the method used in the object determining unit 15 according to the first embodiment. Details of processing by the object determining unit 15a will be described later with reference to the flowchart of FIG. 24.

The distance sensors 2FL and 2FR, a reflection point calculating unit 11, a host vehicle position calculating unit 12, a grouping unit 13, a reference distance setting unit 14, the object determining unit 15a, a parkable area detecting unit 16, and an automatic parking control unit 21 constitute a main part of the parking assistance device 100a.

Figure 23A:
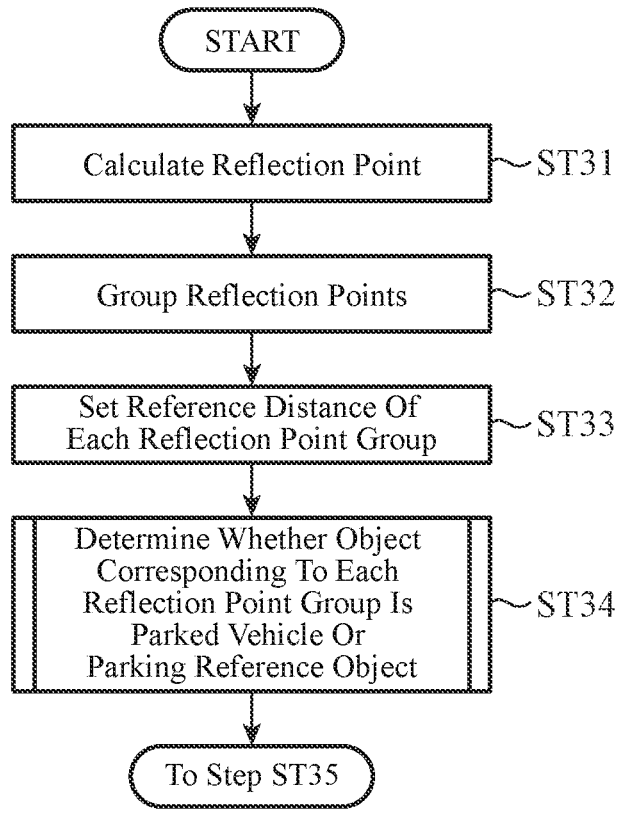
FIG. 23A is a flowchart illustrating operation of the parking assistance device according to the second embodiment of the present invention.
Figure 23B:
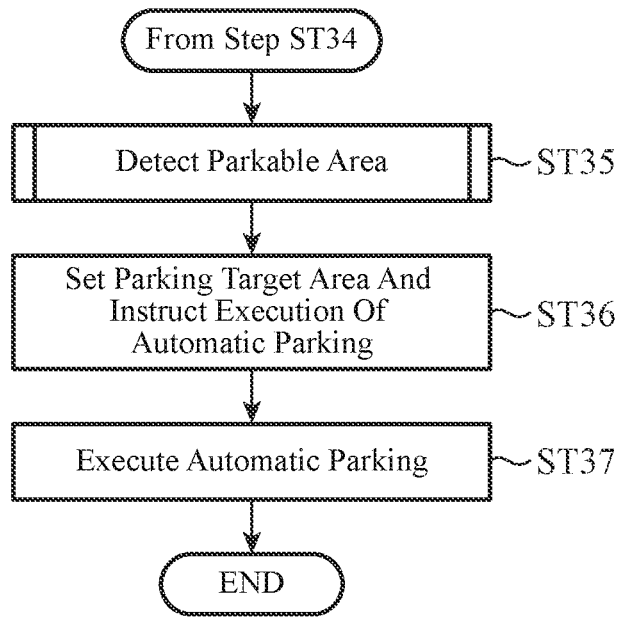
FIG. 23B is the flowchart illustrating the operation of the parking assistance device according to the second embodiment of the present invention.

Next, operation of the parking assistance device 100a will be described with reference to the flowchart of FIG. 23.

First, the reflection point calculating unit 11 calculates a reflection point (step ST31). Subsequently, the grouping unit 13 groups the reflection points (step ST32). Subsequently, the reference distance setting unit 14 sets a reference distance of each reflection point group (step ST33). The contents of processing in steps ST31 to ST33 are similar to those in steps ST1 to ST3 illustrated in FIG. 5, and therefore description thereof will be omitted.

Subsequently, in step ST34, by comparing the reference distance of each reflection point group set by the reference distance setting unit 14 in step ST33 with the object determining threshold value, the object determining unit 15a determines whether an object corresponding to each reflection point group is a parked vehicle or a parking reference object. Details of processing in ST34 will be described later with reference to the flowchart of FIG. 24.

Subsequently, the parkable area detecting unit 16 detects a parkable area (step ST35). The contents of processing in step ST35 are similar to those in step ST5 illustrated in FIG.

Figure 7:
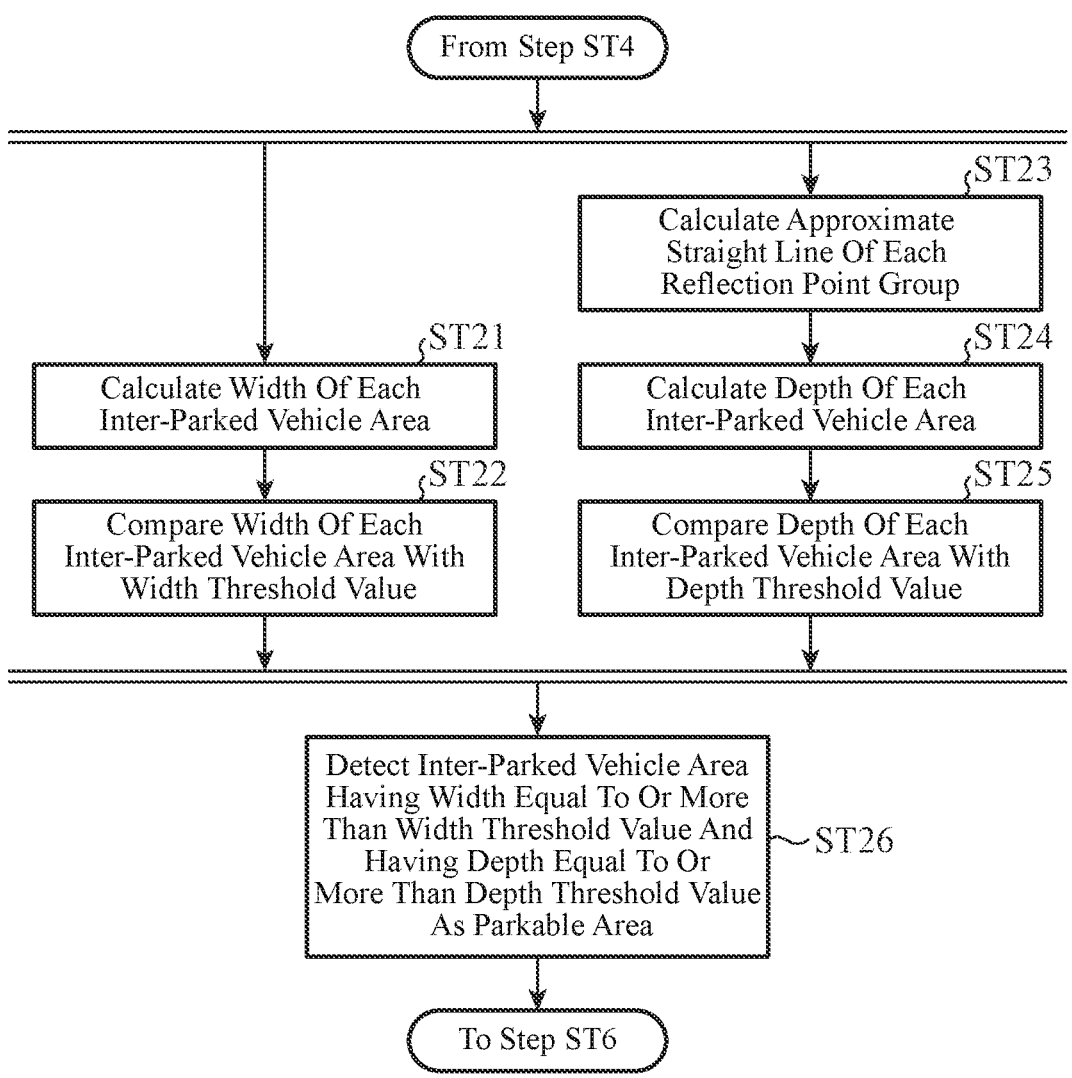
FIG. 7 is a flowchart illustrating detailed operation of a parkable area detecting unit according to the first embodiment of the present invention.

5, that is, steps ST21 to ST26 illustrated in FIG. 7, and therefore description thereof will be omitted.

Subsequently, the parkable area detecting unit 16 sets a parking target area and instructs the automatic parking control unit 21 to execute automatic parking (step ST36). Subsequently, the automatic parking control unit 21 executes automatic parking (step ST37). The contents of processing in steps ST36 and ST37 are similar to those in steps ST6 and ST7 illustrated in FIG. 5, and therefore description thereof will be omitted.

Figure 24:
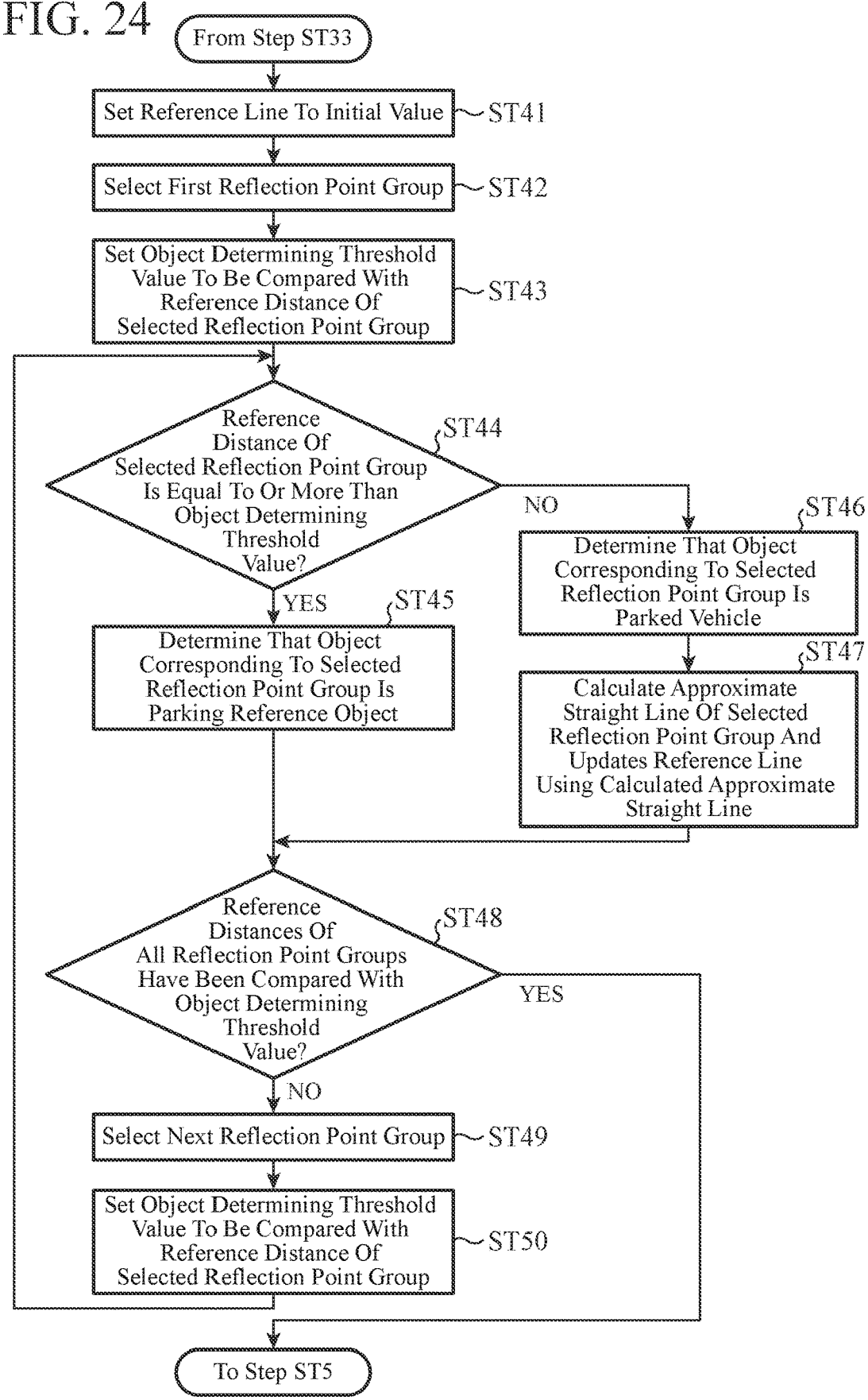
FIG. 24 is a flowchart illustrating detailed operation of an object determining unit according to the second embodiment of the present invention.

Next, details of processing by the object determining unit 15a in step ST34 will be described with reference to the flowchart of FIG. 24.

First, in step ST41, the object determining unit 15a sets the reference line to an initial value. Specifically, for example, the object determining unit 15a calculates an approximate straight line along a side surface portion of the host vehicle 1 at the initial position. The object determining unit 15a sets a straight line substantially parallel to the calculated approximate straight line and away from a host vehicle position by a predetermined distance (for example, a distance of equal to one meter or more and equal to two meters or less) as compared with the calculated approximate line as the reference line.

Subsequently, in step ST42, the object determining unit 15a selects the first set reflection point group among the plurality of reflection point groups set by the grouping unit 13 in step ST32.

Subsequently, in step ST43, the object determining unit 15a sets the object determining threshold value to be compared with the reference distance of the reflection point group selected in step ST42. Specifically, the object determining unit 15a sets a value corresponding to a distance between a host vehicle position corresponding to the reflection point group selected in step ST42 and the reference line set in step ST41 as the object determining threshold value.

Subsequently, in step ST44, the object determining unit 15a compares the reference distance of the reflection point group selected in step ST42 with the object determining threshold value set in step ST43. If the reference distance is a value equal to or more than the object determining threshold value ("YES" in step ST44), in step ST45, the object determining unit 15a determines that an object corresponding to the reflection point group is a parking reference object. In contrast, if the reference distance is a value less than the object determining threshold value ("NO" in step ST44), in step ST46, the object determining unit 15a determines that an object corresponding to the reflection point group is a parked vehicle.

Here, if it is determined that the object is a parked vehicle (step ST46), in step ST47, the object determining unit 15a updates the reference line. Specifically, the object determining unit 15a calculates an approximate straight line of the reflection point group that has been determined to correspond to a parked vehicle in step ST46, that is, an approximate straight line of the reflection point group selected in step ST42. The object determining unit 15a sets a straight line substantially parallel to the calculated approximate straight line and away from a host vehicle position by a predetermined distance as compared with the calculated approximate line as a new reference line. When the host vehicle 1 executes parallel parking, this predetermined distance is set to, for example, about a half value (one meter as one example) of the total width of a general automobile.

Subsequent to step ST45 or step ST47, in step ST48, the object determining unit 15a determines whether or not comparison between the reference distances of all the reflection point groups and the object determining threshold value has been completed.

If the comparison between the reference distances of all the reflection point groups and the object determining threshold value has not been completed ("NO" in step ST48), in step ST49, the object determining unit 15a selects a reflection point group set subsequent to the reflection point group the reference distance of which has been compared with the object determining threshold value in the latest step ST44.

Subsequently, in step ST50, the object determining unit 15a sets the object determining threshold value to be compared with the reference distance of the reflection point group selected in step ST49. Specifically, the object determining unit 15a sets a value corresponding to a distance between a host vehicle position corresponding to the reflection point group selected in step ST49 and the latest reference line as the object determining threshold value. Here, the "latest reference line" is the reference line set in step ST41 when the reference line has not been updated even once, and is the updated reference line in the latest step ST47 when the reference line has been updated one or more times.

Subsequently, the object determining unit 15a returns to step ST44. The object determining unit 15a executes processing in steps ST44 to ST47 similar to the above using the object determining threshold value set in step ST50 for the reflection point group selected in step ST49.

In contrast, if the comparison between the reference distances of all the reflection point groups and the object determining threshold value has been completed ("YES" in step ST48), the object determining unit 15a outputs a determination result of each reflection point group to the parkable area detecting unit 16 and terminates the processing.

Figure 26:
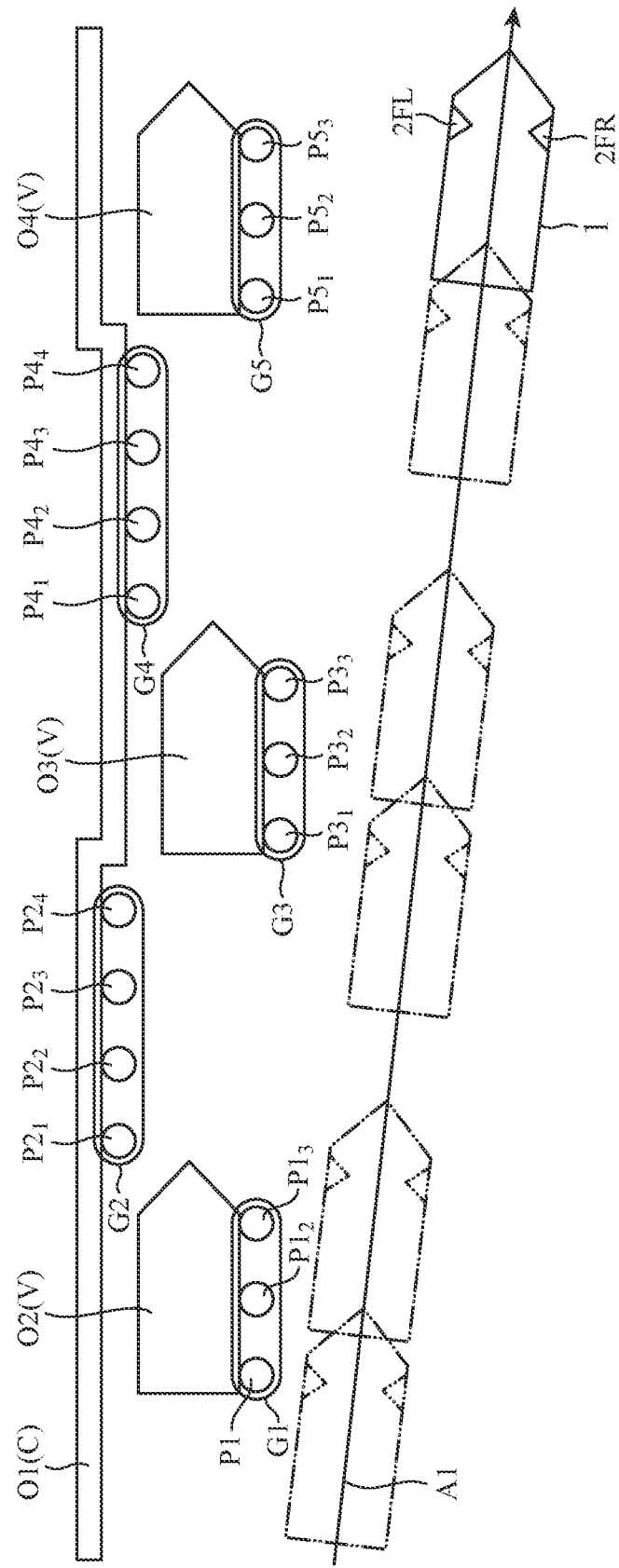
FIG. 26 is an explanatory diagram illustrating a reflection point group and the like set by a grouping unit according to the second embodiment of the present invention.
Figure 27:
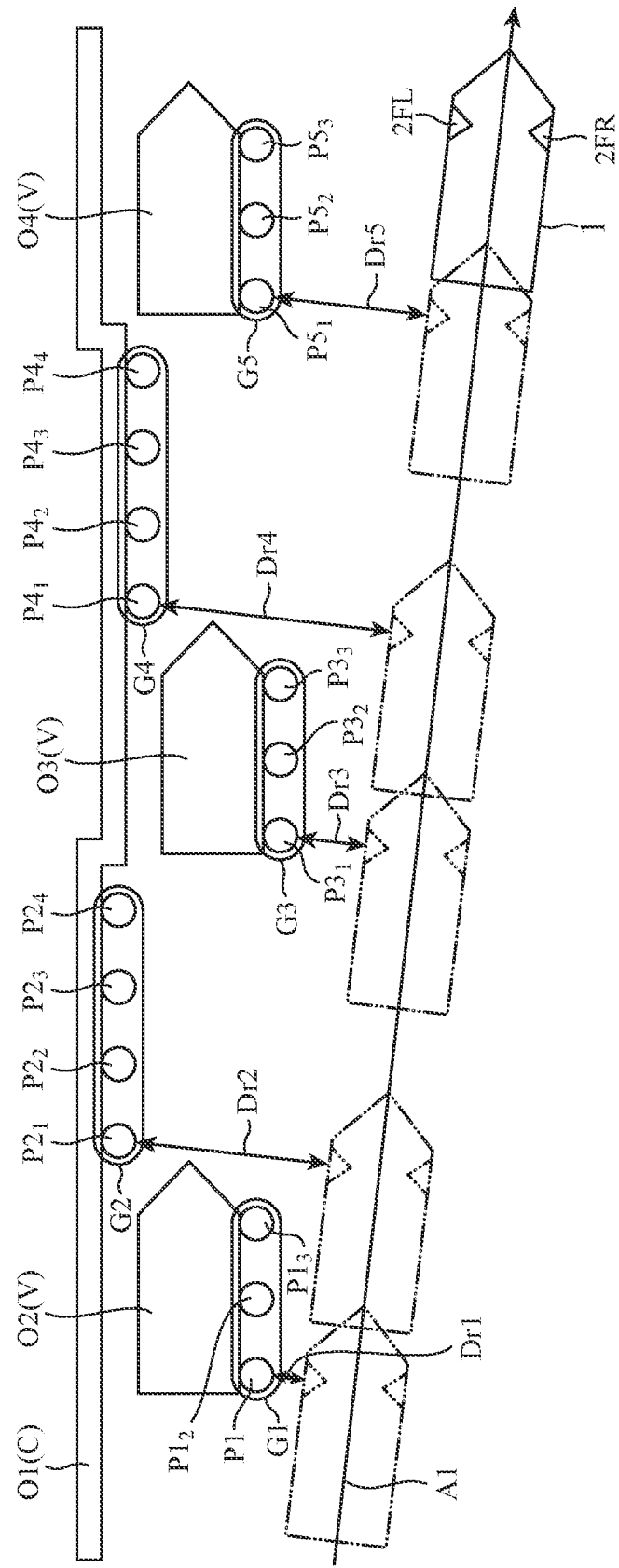
FIG. 27 is an explanatory diagram illustrating a reference distance and the like set by a reference distance setting unit according to the second embodiment of the present invention.

Next, a specific example of processing in steps ST31 to ST33 illustrated in FIG. 23 will be described with reference to FIGS. 25 to 27.

Figure 25:
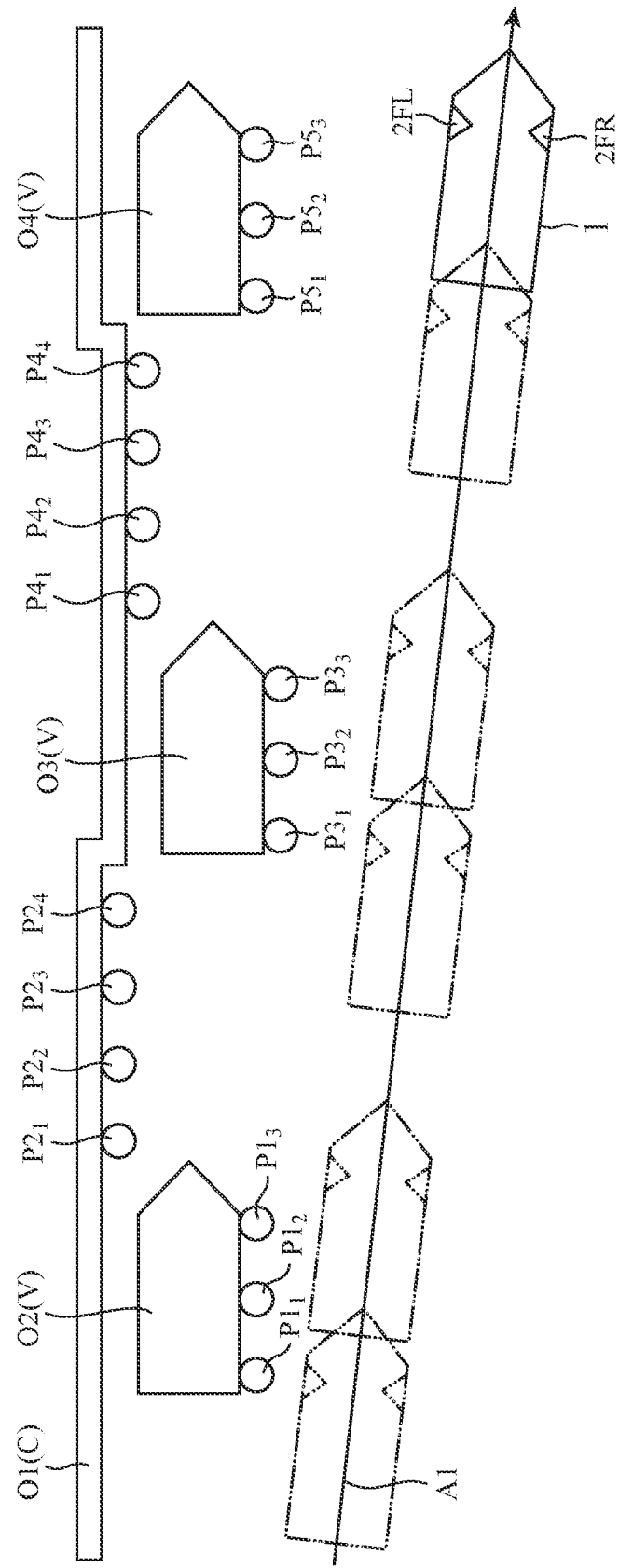
FIG. 25 is an explanatory diagram illustrating a reflection point and the like calculated by a reflection point calculating unit according to the second embodiment of the present invention.

As illustrated in FIG. 25, the three parked vehicles V are parked in parallel along the curb C. The host vehicle 1 travels at a low speed so as to execute parallel parking in an area between the parked vehicles V, that is, in an inter-parked vehicle area. At this time, it is assumed that the host vehicle 1 travels diagonally with respect to an arrangement direction of the parked vehicles V, that is, in a direction gradually away from the parked vehicles V. In the drawing, the arrow A1 indicates a traveling path of the host vehicle 1. The host vehicle position calculating unit 12 calculates the position of the host vehicle 1 at each time point during travel at a low speed, that is, the position of the host vehicle 1 at each point along the arrow A1 as a host vehicle position.

An ultrasonic wave transmitted by the distance sensor 2FL during travel along the arrow A1 is reflected by objects O1 to O4 existing on the left side of the host vehicle 1. As a result, the reflection point calculating unit 11 calculates a plurality of reflection points $P1_1$ to $P1_3$, $P2_1$ to $P2_4$, $P3_1$ to $P3_3$, $P4_1$ to $P4_4$, and $P5_1$ to $P5_3$ (step ST31). Here, the object O1 is the curb C, that is, a parking reference object, and each of the objects O2 to O4 is the parked vehicle V.

Subsequently, the grouping unit 13 groups the reflection points $P1_1$ to $P1_3$, $P2_1$ to $P2_4$, $P3_1$ to $P3_3$, $P4_1$ to $P4_4$, and $P5_1$ to $P5_3$ (step ST32). By grouping, as illustrated in FIG. 26, a reflection point group G1 including three reflection points $P1_1$ to $P1_3$, a reflection point group G2 including four reflection points $P2_1$ to $P2_4$, a reflection point group G3 including three reflection points $P3_1$ to $P3_3$, a reflection point group G4 including four reflection points P4$_1$ to P4$_4$, and a reflection point group G5 including three reflection points P5$_1$ to P5$_3$ are set.

Subsequently, the reference distance setting unit 14 sets the reference distances of the reflection point groups G1 to G5 (step ST33). That is, as illustrated in FIG. 27, the reference distance setting unit 14 sets a minimum value among distances between each of the three reflection points P1$_1$ to P1$_3$ included in the reflection point group G1 and a host vehicle position, that is, a distance Dr1 between the reflection point P1$_1$ and a host vehicle position corresponding to the reflection point P1$_1$ as the reference distance of the reflection point group G1. Similarly, the reference distance setting unit 14 sets a distance Dr2 between the reflection point P2$_1$ and a host vehicle position corresponding to the reflection point P2$_1$ as the reference distance of the reflection point group G2, sets a distance Dr3 between the reflection point P3$_1$ and a host vehicle position corresponding to the reflection point P3$_1$ as the reference distance of the reflection point group G3, sets a distance Dr4 between the reflection point P4$_1$ and a host vehicle position corresponding to the reflection point P4$_1$ as the reference distance of the reflection point group G4, and sets a distance Dr5 between the reflection point P5$_1$ and a host vehicle position corresponding to the reflection point P5$_1$ as the reference distance of the reflection point group G5.

Next, a specific example of processing in steps ST41 to ST50 illustrated in FIG. 24 will be described with reference to FIG. 28.

First, the object determining unit 15a sets the reference line to an initial value (step ST41). Specifically, the object determining unit 15a calculates an approximate straight line La0 along a left side surface portion of the host vehicle 1 at the initial position. The object determining unit 15a sets a straight line Lr0 substantially parallel to the approximate straight line La0 and away from a host vehicle position by a predetermined distance β (for example, a distance of equal to one meter or more and equal to two meters or less) as compared with the approximate line La0 as the reference line.

Subsequently, the object determining unit 15a selects the next reflection point group G1 (step ST42). The object determining unit 15a sets a value Dth1 corresponding to a distance between a host vehicle position corresponding to the reflection point group G1 and the reference line Lr0 as the object determining threshold value (step ST43).

Subsequently, the object determining unit 15a compares the reference distance Dr1 of the reflection point group G1 with the object determining threshold value Dth1 (step ST44). Since the reference distance Dr1 is a value less than the object determining threshold value Dth1 ("NO" in step ST44), the object determining unit 15a determines that the object O2 corresponding to the reflection point group G1 is the parked vehicle V (step ST46), and updates the reference line (step ST47). Specifically, the object determining unit 15a calculates the approximate straight line La1 of the reflection point group G1, and sets a straight line Lr1 substantially parallel to the approximate straight line La1 and away from a host vehicle position by a predetermined distance γ (for example, one meter) as compared with the approximate line La1 as a new reference line.

Subsequently, the object determining unit 15a selects the next reflection point group G2 (step ST49). The object determining unit 15a sets a value Dth2 corresponding to a distance between a host vehicle position corresponding to the reflection point group G2 and the latest reference line Lr1 as a new object determining threshold value (step ST50).

Subsequently, the object determining unit 15a compares the reference distance Dr2 of the reflection point group G2 with the object determining threshold value Dth2 (step ST44). Since the reference distance Dr2 is a value equal to or more than the object determining threshold value Dth2 ("YES" in step ST44), the object determining unit 15a determines that the object O1 corresponding to the reflection point group G2 is a parking reference object (step ST45).

Subsequently, the object determining unit 15a selects the next reflection point group G3 (step ST49). The object determining unit 15a sets a value Dth3 corresponding to a distance between a host vehicle position corresponding to the reflection point group G3 and the latest reference line Lr1 as a new object determining threshold value (step ST50).

Subsequently, the object determining unit 15a compares the reference distance Dr3 of the reflection point group G3 with the object determining threshold value Dth3 (step ST44). Since the reference distance Dr3 is a value less than the object determining threshold value Dth3 ("NO" in step ST44), the object determining unit 15a determines that the object O3 corresponding to the reflection point group G3 is the parked vehicle V (step ST46), and updates the reference line (step ST47). Specifically, the object determining unit 15a calculates the approximate straight line La3 of the reflection point group G3, and sets a straight line Lr2 substantially parallel to the approximate straight line La3 and away from a host vehicle position by the predetermined distance γ as compared with the approximate line La3 as a new reference line.

Subsequently, the object determining unit 15a selects the next reflection point group G4 (step ST49). The object determining unit 15a sets a value Dth4 corresponding to a distance between a host vehicle position corresponding to the reflection point group G4 and the latest reference line Lr2 as a new object determining threshold value (step ST50).

Subsequently, the object determining unit 15a compares the reference distance Dr4 of the reflection point group G4 with the object determining threshold value Dth4 (step ST44). Since the reference distance Dr4 is a value equal to or more than the object determining threshold value Dth4 ("YES" in step ST44), the object determining unit 15a determines that the object O1 corresponding to the reflection point group G4 is a parking reference object (step ST45).

Subsequently, the object determining unit 15a selects the next reflection point group G5 (step ST49). The object determining unit 15a sets a value Dth5 corresponding to a distance between a host vehicle position corresponding to the reflection point group G5 and the latest reference line Lr2 as a new object determining threshold value (step ST50).

Subsequently, the object determining unit 15a compares the reference distance Dr5 of the reflection point group G5 with the object determining threshold value Dth5 (step ST44). Since the reference distance Dr5 is a value less than the object determining threshold value Dth5 ("NO" in step ST44), the object determining unit 15a determines that the object O3 corresponding to the reflection point group G5 is the parked vehicle V (step ST46), and updates the reference line (step ST47). Specifically, the object determining unit 15a calculates the approximate straight line La5 of the reflection point group G5, and sets a straight line Lr3 substantially parallel to the approximate straight line La5 and away from a host vehicle position by the predetermined distance γ as compared with the approximate line La5 as a new reference line.

Subsequently, since the comparison between the reference distances Dr1 to Dr5 of all the reflection point groups G1 to G5 and the object determining threshold value has been completed ("YES" in step ST48), the object determining unit 15a outputs the above determination result to the parkable area detecting unit 16 and terminates the processing.

In this manner, by comparing the reference distance of each reflection point group with the object determining threshold value, it is possible to determine whether an object existing on the left side of the host vehicle 1 is a parked vehicle or a parking reference object using one distance sensor 2FL. Therefore, compared with the parking assistance device disclosed in Patent Literature 1 using two distance sensors having different detectable ranges in the height direction, it is possible to reduce the minimum number of distance sensors required for determining whether an object existing on the left side of the host vehicle 1 is a parked vehicle or a parking reference object. Similarly, it is possible to reduce the minimum number of distance sensors required for determining whether an object existing on the right side of the host vehicle 1 is a parked vehicle or a parking reference object. As a result, it is possible to easily secure an installation space of the distance sensors in the host vehicle 1.

In addition, by update of the reference line, even when the host vehicle 1 travels diagonally with respect to an arrangement direction of parked vehicles, it is possible to exactly determine whether an object corresponding to each reflection point group is a parked vehicle or a parking reference object.

Figure 28:
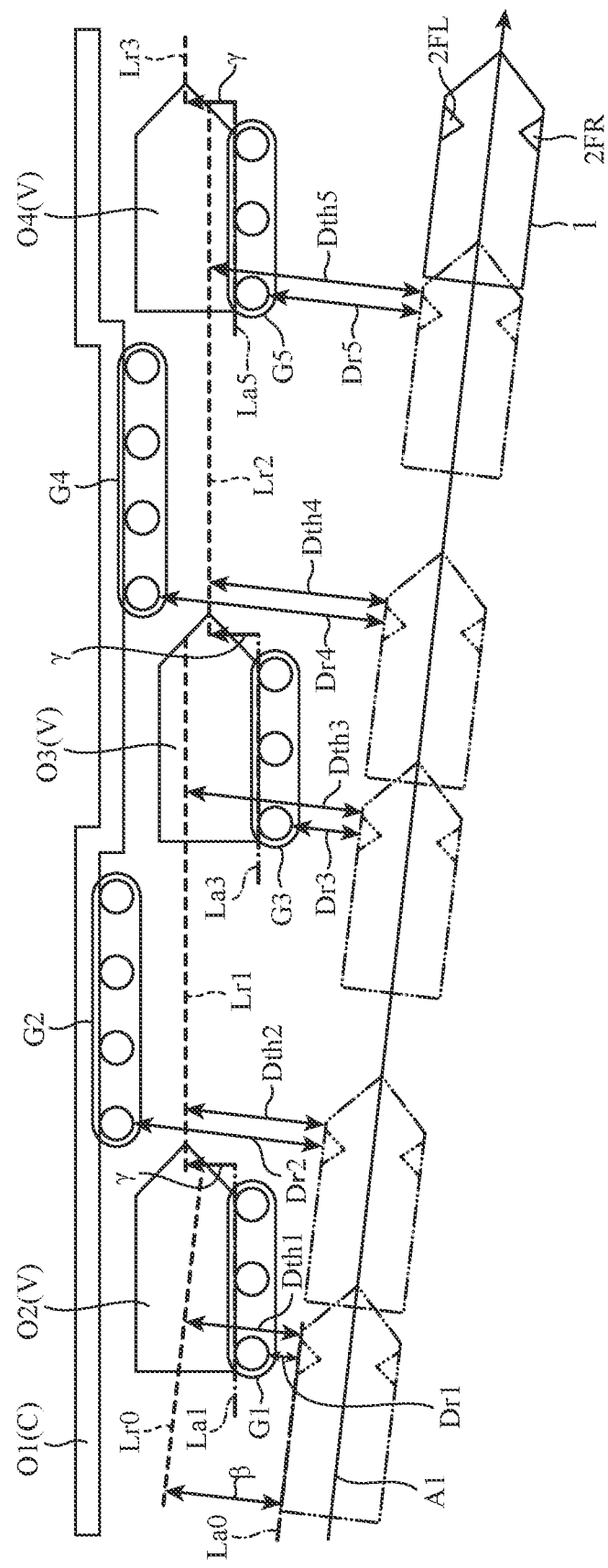
FIG. 28 is an explanatory diagram illustrating a reference line, an object determining threshold value, and the like set by the object determining unit according to the second embodiment of the present invention.
Figure 29:
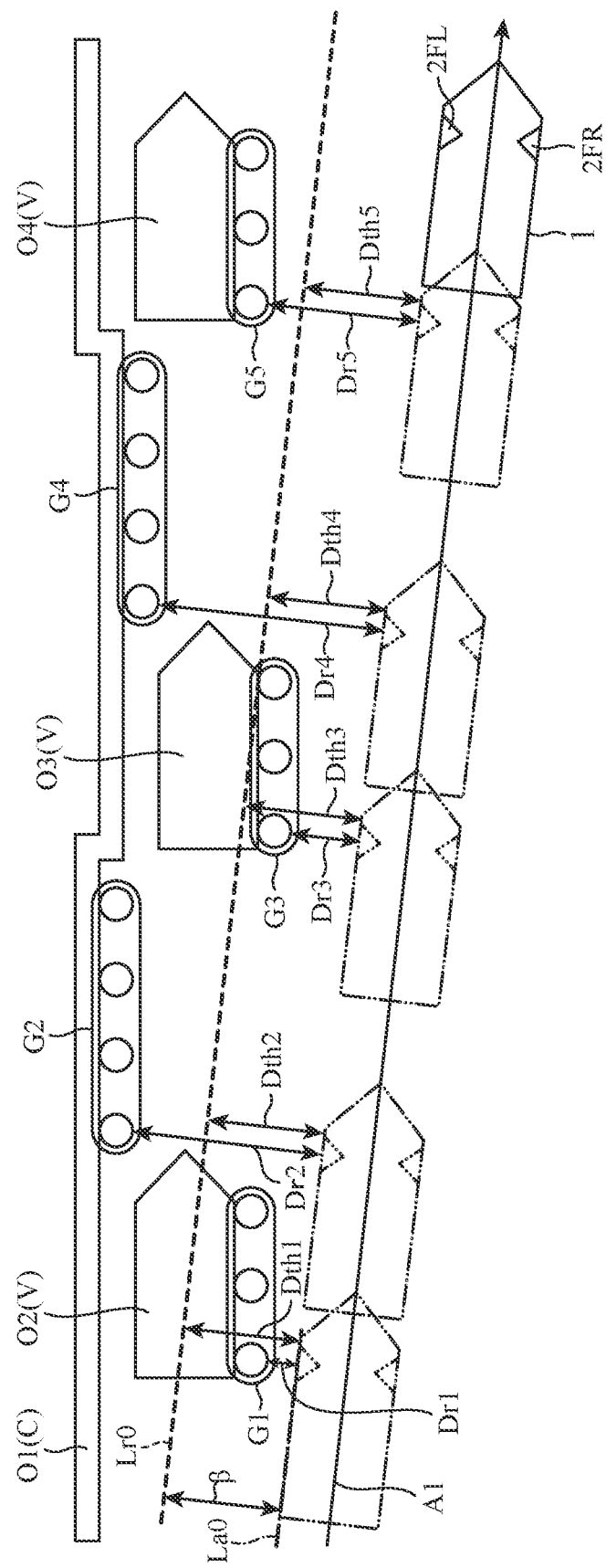
FIG. 29 is an explanatory diagram illustrating a reference line, an object determining threshold value, and the like supposing the object determining unit does not update the reference line.

For example, in a state similar to the example illustrated in FIG. 28, supposing the reference line is not updated but is constant at the initial value Lr0, as illustrated in FIG. 29, the reference distance Dr5 of the reflection point group G5 is a value equal to or more than the object determining threshold value Dth5. In this case, although the object O4 corresponding to the reflection point group G5 is the parked vehicle V, the object O4 is determined to be a parking reference object, and erroneous determination occurs. By update of the reference line, occurrence of such erroneous determination can be suppressed.

The parking assistance device 100a according to the second embodiment can adopt various modifications similar to those described in the first embodiment as described below.

For example, the object determining unit 15a may calculate a group width of each reflection point group and may determine that only a reflection point group having a group width equal to or more than a group width threshold value among reflection point groups each having a reference distance equal to or more than the object determining threshold value corresponds to a parking reference object.

The reference distance setting unit 14 may calculate a distance between each of the plurality of reflection points included in each of the plurality of reflection point groups and a host vehicle position, and may set a central value or an average value of the calculated distances as a reference distance of each of the plurality of reflection point groups.

By outputting only a reflection point indicating a position within the detectable range among the reflection points calculated by two-circle intersection processing to the grouping unit 13, the reflection point calculating unit 11 may exclude a reflection point indicating a position outside the detectable range from a grouping target.

The parking assistance device 100a may be a device not including the automatic parking control unit 21. Alternatively, the parking assistance device 100a may be a device not including the host vehicle position calculating unit 12, the parkable area detecting unit 16, or the automatic parking control unit 21.

The parking assistance device 100a may include distance sensors 2RL and 2RR instead of the distance sensors 2FL and 2FR. Alternatively, the parking assistance device 100a may include the distance sensors 2RL and 2RR in addition to the distance sensors 2FL and 2FR.

The distance sensors 2FL, 2FR, 2RL, and 2RR may transmit and receive a radio wave in a millimeter wave band or a laser beam instead of an ultrasonic wave.

As described above, the parking assistance device 100a according to the second embodiment includes: the distance sensors 2FL, 2FR, 2RL, and 2RR for transmitting detection waves toward a side of the host vehicle 1 while the host vehicle 1 is traveling and receiving reflected waves of the detection waves; the reflection point calculating unit 11 for calculating reflection points indicating positions where the detection waves have been reflected; the grouping unit 13 for grouping the reflection points; the reference distance setting unit 14 for setting a reference distance corresponding to a distance between a host vehicle position indicating the position of the traveling host vehicle 1 and the reflection point group set by grouping; and the object determining unit 15a for setting an object determining threshold value to be compared with the reference distance and determining whether an object corresponding to the reflection point group is a parked vehicle or a parking reference object by comparing the reference distance with the object determining threshold value. As a result, it is possible to determine whether an object detected using the distance sensors 2FL, 2FR, 2RL, and 2RR is a parked vehicle or a parking reference object, and to easily secure an installation space of the distance sensors 2FL, 2FR, 2RL, and 2RR in the host vehicle 1.

The object determining unit 15a calculates an approximate straight line of the reflection point group that has been determined to correspond to a parked vehicle and sets an object determining threshold value using a reference line corresponding to the approximate straight line. As a result, it is possible to set the object determining threshold value to an appropriate value. As a result, reliability of determination by the object determining unit 15a can be improved.

In addition, the object determining unit 15a updates the reference line each time the object determining unit 15a determines that an object is a parked vehicle. As a result, it is possible to suppress occurrence of erroneous determination due to the host vehicle 1 traveling diagonally with respect to the arrangement direction of parked vehicles. As a result, reliability of determination by the object determining unit 15a can be further improved.

Note that the present invention can freely combine the embodiments to each other, modify any constituent element in each of the embodiments, or omit any constituent element in each of the embodiments within the scope of the invention.

INDUSTRIAL APPLICABILITY

The parking assistance device of the present invention can be used for assisting parallel parking or perpendicular parking.

REFERENCE SIGNS LIST

1: Host vehicle, 2FL, 2FR, 2RL, 2RR: Distance sensor, 3: Wheel speed sensor, 4: Yaw rate sensor, 5: Steering sensor, 6: Engine, 7: Steering, 8: Brake, 10: Electronic control unit (first ECU), 11: Reflection point calculating unit, 12: Host vehicle position calculating unit, 13: Grouping unit, 14: Reference distance setting unit, 15, 15*a*: Object determining unit, 16: Parkable area detecting unit, 20: Electronic control unit (second ECU), 21: Automatic parking control unit, 31: Processor, 32: Memory, 33: Processing circuit, 41: Processor, 42: Memory, 43: Processing circuit, 100, 100*a*: Parking assistance device

The invention claimed is:

1. A parking assistance device comprising:
at least one distance sensor for transmitting a detection wave toward a side of a host vehicle while the host vehicle is traveling and receiving a reflected wave of the detection wave;
a processor; and
a memory storing instructions which, when executed by the processor, causes the processor to perform processes of:
calculating a reflection point indicating a position where the detection wave is reflected;
grouping the reflection points;
setting a reference distance corresponding to a minimum distance between a host vehicle position indicating a position of the host vehicle that is traveling and a reflection point group set by the grouping; and
setting an object determining threshold value to be compared with the reference distance and determining that when the reference distance is equal to or greater than the object determining threshold value, an object corresponding to the reflection point group is a parking reference object, and that when the reference distance is less than the object determining threshold value, the object corresponding to the reflection point group is a parked vehicle,
wherein the processor updates the object determining threshold value by using the reference distance of the reflection point group that has been determined to correspond to the parked vehicle when the processor determines that the object is the parked vehicle.

2. The parking assistance device according to claim 1, wherein the processor calculates a group width which is a width of the reflection point group and determines that the reflection point group having the group width equal to or more than a group width threshold value among the reflection point groups each having the reference distance equal to or more than the object determining threshold value corresponds to the parking reference object.

3. The parking assistance device according to claim 1, wherein the processor calculates a distance between each of the plurality of reflection points included in the reflection point group and the host vehicle position, and sets a minimum value among the calculated distances as the reference distance.

4. The parking assistance device according to claim 1, wherein the processor calculates a distance between each of the plurality of reflection points included in the reflection point group and the host vehicle position, and sets a central value or an average value of the calculated distances as the reference distance.

5. The parking assistance device according to claim 1, wherein the processor calculates the reflection point by two-circle intersection processing, and excludes the reflection point indicating a position outside a detectable range by the at least one distance sensor from a target of the grouping.

6. The parking assistance device according to claim 1,
wherein the at least one distance sensor comprises a plurality of distance sensors,
wherein one of the distance sensors is provided on a left side portion of a front half portion of the host vehicle, and one of the distance sensors is provided on a right side portion of the front half portion of the host vehicle, or
one of the distance sensors is provided on a left side portion of a rear half portion of the host vehicle, and one of the distance sensors is provided on a right side portion of the rear half portion of the host vehicle.

7. A parking assistance device comprising:
at least one distance sensor for transmitting a detection wave toward a side of a host vehicle while the host vehicle is traveling and receiving a reflected wave of the detection wave;
a processor; and
a memory storing instructions which, when executed by the processor, causes the processor to perform processes of:
calculating a reflection point indicating a position where the detection wave is reflected;
grouping the reflection points;
setting a reference distance corresponding to a minimum distance between a host vehicle position indicating a position of the host vehicle that is traveling and a reflection point group set by the grouping; and
setting an object determining threshold value to be compared with the reference distance and determining that when the reference distance is equal to or greater than the object determining threshold value, an object corresponding to the reflection point group is a parking reference object, and that when the reference distance is less than the object determining threshold value, the object corresponding to the reflection point group is a parked vehicle,
wherein when determining that the object is the parked vehicle, the processor calculates an approximate straight line of the reflection point group that has been determined to correspond to the parked vehicle and updates the object determining threshold value using a reference line corresponding to the approximate straight line.

8. The parking assistance device according to claim 7, wherein the processor calculates a group width which is a width of the reflection point group and determines that the reflection point group having the group width equal to or more than a group width threshold value among the reflection point groups each having the reference distance equal to or more than the object determining threshold value corresponds to the parking reference object.

9. The parking assistance device according to claim 7, wherein the processor calculates a distance between each of the plurality of reflection points included in the reflection point group and the host vehicle position, and sets a minimum value among the calculated distances as the reference distance.

10. The parking assistance device according to claim 7, wherein the processor calculates a distance between each of the plurality of reflection points included in the reflection point group and the host vehicle position, and sets a central value or an average value of the calculated distances as the reference distance.

11. The parking assistance device according to claim 7, wherein the processor calculates the reflection point by two-circle intersection processing, and excludes the reflection point indicating a position outside a detectable range by the at least one distance sensor from a target of the grouping.

12. The parking assistance device according to claim 7,
wherein the at least one distance sensor comprises a plurality of distance sensors,
wherein one of the distance sensors is provided on a left side portion of a front half portion of the host vehicle, and one of the distance sensors is provided on a right side portion of the front half portion of the host vehicle, or
one of the distance sensors is provided on a left side portion of a rear half portion of the host vehicle, and one of the distance sensors is provided on a right side portion of the rear half portion of the host vehicle.

\* \* \* \* \*